United States Patent
Tascione et al.

(10) Patent No.: US 10,877,483 B2
(45) Date of Patent: *Dec. 29, 2020

(54) FORMATTING SENSOR DATA FOR USE IN AUTONOMOUS VEHICLE COMMUNICATIONS PLATFORM

(71) Applicant: UATC, LLC, San Francisco, CA (US)

(72) Inventors: Daniel Tascione, Pittsburgh, PA (US); Justin Waters, Pittsburgh, PA (US); Mark Sibenac, Pittsburgh, PA (US); Jordan Brindza, Pittsburgh, PA (US); Daniel Leland Strother, Pittsburgh, PA (US); Morgan Jones, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 16/106,936

(22) Filed: Aug. 21, 2018

(65) Prior Publication Data

US 2019/0004530 A1    Jan. 3, 2019

Related U.S. Application Data

(63) Continuation of application No. 15/726,050, filed on Oct. 5, 2017, now Pat. No. 10,101,747, which is a (Continued)

(51) Int. Cl.
*H04N 13/207* (2018.01)
*G05D 1/02* (2020.01)
*H04N 13/204* (2018.01)
*H04N 13/296* (2018.01)
*B60W 30/08* (2012.01)
*G01S 13/86* (2006.01)
*G01S 13/931* (2020.01)
*G01S 19/13* (2010.01)
(Continued)

(52) U.S. Cl.
CPC .......... *G05D 1/0231* (2013.01); *B60W 30/08* (2013.01); *G01S 13/86* (2013.01); *G01S 13/931* (2013.01); *G05D 1/0276* (2013.01); *H04N 13/204* (2018.05); *H04N 13/207* (2018.05); *H04N 13/296* (2018.05); *B60Y 2400/3015* (2013.01); *G01B 11/24* (2013.01); *G01S 19/13* (2013.01); *G06K 9/00791* (2013.01)

(58) Field of Classification Search
CPC ... H04N 13/204; H04N 13/207; H04N 13/296
USPC ........................................................ 348/148
See application file for complete search history.

(56) References Cited

U.S. PATENT DOCUMENTS 3,899,928 A  8/1975 Fraiture
3,932,858 A  1/1976 Smith
(Continued)

*Primary Examiner* — Nguyen T Truong
(74) *Attorney, Agent, or Firm* — Dority & Manning, P.A.

(57) ABSTRACT

A sensor synchronization system for an autonomous vehicle is described. Upon initializing a master clock on a master processing node for a sensor apparatus of the autonomous vehicle, the system determines whether an external timing signal is available. If the signal is available, the system synchronizes the master clock with the external timing signal. Based on a clock cycle of the master clock, the system propagates timestamp messages to the sensors of the sensor apparatus, receives sensor data, and formats the sensor data based on the timestamp messages.

20 Claims, 16 Drawing Sheets

Related U.S. Application Data continuation-in-part of application No. 14/967,205, filed on Dec. 11, 2015, now Pat. No. 9,785,150.

(51) Int. Cl.
  *G06K 9/00* (2006.01)
  *G01B 11/24* (2006.01)

(56) References Cited

U.S. PATENT DOCUMENTS

| | | |
|---|---|---|
| 3,941,203 A | 3/1976 | Leconte |
| 4,217,644 A | 8/1980 | Kato |
| 4,255,789 A | 3/1981 | Hartford |
| 4,325,336 A | 4/1982 | Kuno et al. |
| 4,408,290 A | 10/1983 | Kubo |
| 4,536,748 A | 8/1985 | Tonello |
| 4,810,953 A | 3/1989 | Huynh |
| 5,357,141 A | 10/1994 | Nitschke |
| 5,369,591 A | 11/1994 | Broxmeyer |
| 5,450,329 A | 9/1995 | Tanner |
| 5,469,371 A | 11/1995 | Bass |
| 5,682,100 A | 10/1997 | Rossi |
| 5,740,047 A | 4/1998 | Pilley |
| 5,812,427 A | 9/1998 | Nonoyama |
| 5,831,570 A | 11/1998 | Ammar |
| 5,907,293 A | 5/1999 | Tognazzini |
| 5,983,161 A | 11/1999 | Lemelson |
| 6,115,659 A | 9/2000 | Buchheim |
| 6,154,292 A | 11/2000 | Motoi |
| 6,360,171 B1 | 3/2002 | Miyamoto |
| 6,370,475 B1 | 4/2002 | Breed |
| 6,405,132 B1 | 6/2002 | Breed |
| 6,606,033 B1 | 8/2003 | Crocker |
| 6,611,755 B1 | 8/2003 | Coffee |
| 6,873,642 B1 | 3/2005 | Fey |
| 7,200,409 B1 | 4/2007 | Ichikawa |
| 7,295,925 B2 | 11/2007 | Breed |
| 7,333,725 B1 | 2/2008 | Frazier |
| 7,426,437 B2 | 9/2008 | Breed |
| 7,840,355 B2 | 11/2010 | Breed |
| 8,355,117 B2 | 1/2013 | Niclass |
| 8,849,494 B1 | 9/2014 | Herbach |
| 9,103,671 B1 | 8/2015 | Breed |
| 2002/0071509 A1 | 6/2002 | Richards |
| 2002/0181799 A1 | 12/2002 | Matsugu |
| 2003/0009275 A1 | 1/2003 | Koike |
| 2003/0061002 A1 | 3/2003 | Steinbrecher |
| 2003/0112133 A1 | 6/2003 | Webb |
| 2003/0218551 A1 | 11/2003 | Crocker |
| 2004/0101161 A1 | 5/2004 | Roh |
| 2004/0119633 A1 | 6/2004 | Oswald |
| 2004/0128062 A1 | 7/2004 | Ogino |
| 2004/0133390 A1 | 7/2004 | Osorio |
| 2004/0138809 A1 | 7/2004 | Mukaiyama |
| 2004/0249485 A1 | 12/2004 | Bondarev |
| 2005/0088318 A1 | 4/2005 | Liu |
| 2007/0030342 A1 | 2/2007 | Wilburn |
| 2007/0076652 A1 | 4/2007 | Nishiwaki |
| 2007/0244643 A1 | 10/2007 | Tengler |
| 2007/0276600 A1 | 11/2007 | King |
| 2007/0286471 A1 | 12/2007 | Kaneda |
| 2008/0040023 A1 | 2/2008 | Breed |
| 2008/0247735 A1 | 10/2008 | Kazanzides |
| 2009/0051396 A1 | 2/2009 | Shimamoto |
| 2010/0054282 A1 | 3/2010 | Schirmer |
| 2011/0002378 A1 | 1/2011 | Raveendran |
| 2011/0002379 A1 | 1/2011 | Raveendran |
| 2011/0002405 A1 | 1/2011 | Raveendran |
| 2011/0125063 A1 | 5/2011 | Shalon |
| 2012/0096942 A1 | 4/2012 | Hayashi |
| 2012/0310466 A1 | 12/2012 | Fairfield |
| 2014/0177932 A1 | 6/2014 | Milne |
| 2015/0204983 A1 | 7/2015 | Georgy |
| 2016/0103002 A1 | 4/2016 | Milota |
| 2016/0223677 A1* | 8/2016 | Trevino ............... G01S 19/215 |

* cited by examiner

FORMATTING SENSOR DATA FOR USE IN AUTONOMOUS VEHICLE COMMUNICATIONS PLATFORM

CROSS REFERENCE TO RELATED APPLICATION

This application is a continuation of U.S. patent application Ser. No. 15/726,050, filed on Oct. 5, 2017, which is a continuation-in-part of U.S. patent application Ser. No. 14/967,205, entitled "FORMATTING SENSOR DATA FOR USE IN AUTONOMOUS VEHICLE COMMUNICATIONS PLATFORM," filed on Dec. 11, 2015, now U.S. Pat. No. 9,785,150; the aforementioned priority applications being hereby incorporated by reference in their entireties.

TECHNICAL FIELD

Examples described herein relate to autonomous vehicles, and more specifically, to acquiring time-synchronized sensor data for controlling autonomous vehicles.

BACKGROUND

Autonomous vehicles have replaced human drivers with computer-implemented intelligence to control and/or drive the vehicle. Autonomous vehicles typically utilize a number of sensors and other automation technology to help navigate the surrounding environment. For example, three-dimensional (3D) sensing technology may be used to map a vehicle's local environment and larger surrounding areas. This enables an autonomous vehicle to safely navigate and traverse terrain while avoiding both static objects (e.g., trees, structures, drop-offs, etc.) and dynamic objects (e.g., people, animals, vehicles, etc.) in its path.

3D sensing technology relies on real-time sensor data from a number of sensors to construct a 3D image of the surrounding environment. However, the timing of the sensor data is important to accurately construct the 3D image, especially when the autonomous vehicle is traveling at high speeds.

DETAILED DESCRIPTION

Figure 1:
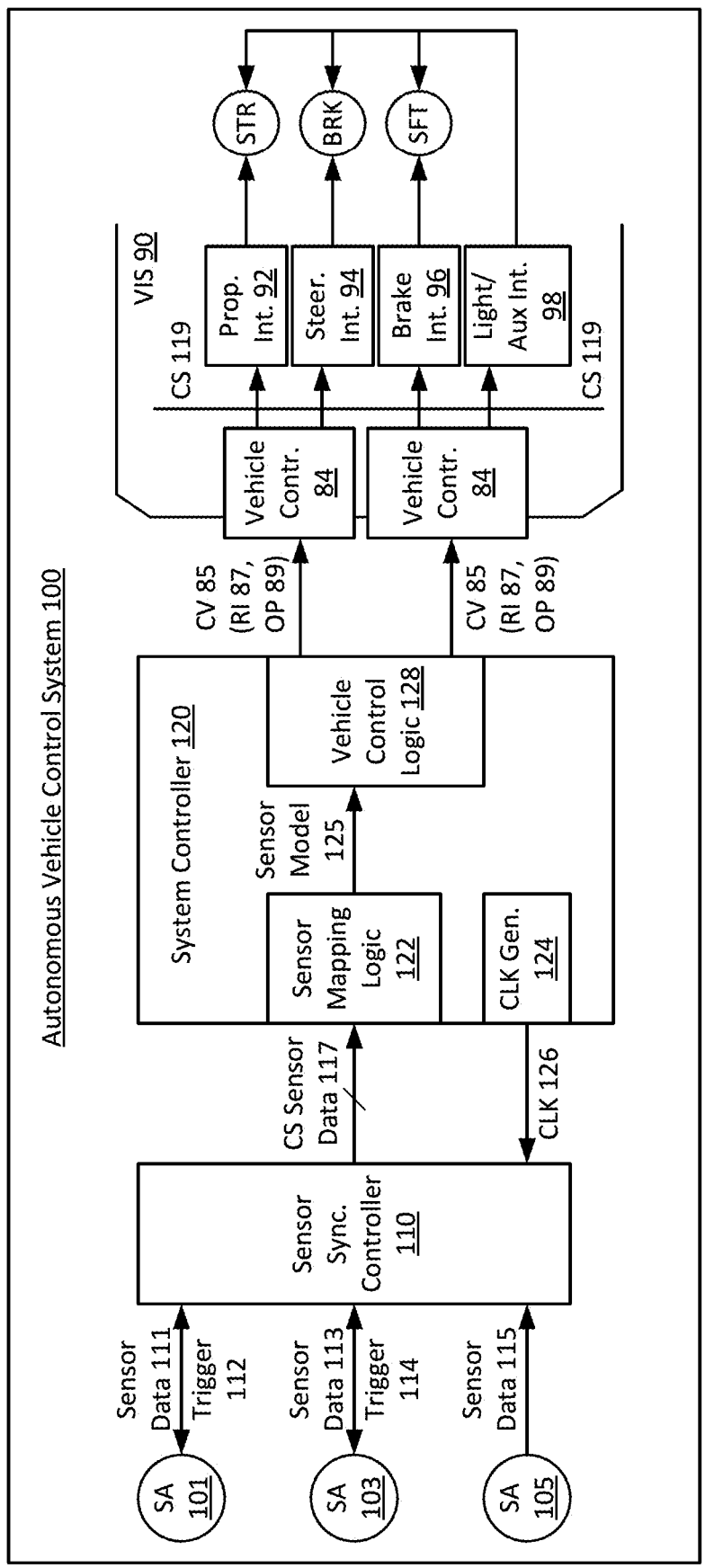
FIG. 1 shows a block diagram of a control system for operating an autonomous vehicle in accordance with example implementations.

Examples described herein provide for a sensor interface that may be used to process sensor data captured by a plurality of sensors based at least in part on a local clock signal. The system may format the captured sensor data to be recognized and/or processed by one or more processors or controllers used to navigate an autonomous vehicle. In particular, the formatted sensor data may be combined to generate a three-dimensional (3D) image of the vehicle's surrounding environment.

Keeping time is an important function on autonomous vehicles. As most inter-device communication is done via Ethernet, and most tasks on the computing nodes run asynchronously of one another, comparing timestamps gives an accurate way of knowing when something, such as a sensor reading, occurred. In order for these timestamps to have meaning between nodes, each device should keep the same value of time as all of the other devices.

In some aspects, time is synchronized using a "Pulse Per Second" (PPS) signal. The PPS is an electronic pulse that is propagated via a dedicated wire to each device (e.g., sensor) in the system. The rising edge of this pulse corresponds with the start (or top) of a second. Since the run of the wire is very small, the pulse is received by each device at the same time. Using the PPS signal, every device knows when a second begins. In addition to the pulse, each device receives a timestamp that defines what clock time each pulse corresponds to. This timestamp describes the time (in seconds) of the last pulse that was received. For proper functioning, this message is received after the corresponding pulse, but before the next pulse.

AVs can derive system time based on a PPS signal from a global positioning system (GPS) receiver, which, while very precise, has limitations such as a lack of signal indoors. Through the use of a master clock on a master node of the AV, the AV can provide an estimated model of time that is still universally consistent, even without a GPS lock.

In some aspects, the master node includes a freerunning mode that addresses the issue of the difficulties involved in acquiring a GPS lock. In particular, to calibrate a vehicle, it would be necessary to move the vehicle outdoors, acquire the lock, then move it back into the calibration rig. This task is overly burdensome when dealing with a large number of vehicles. In addition, having a time synced up with GPS exactly is only necessary in very limited circumstances (such as multi-vehicle coordination). In many typical use cases, an internally consistent time that has deterministic behavior (i.e. minimal jitter, skew correction) is sufficient for AV operation.

According to some examples, the sensor interface generates a plurality of sensor pulses that are each offset in phase relative to the local clock signal by a respective amount. The sensor interface then receives sensor data from a sensor apparatus and formats the sensor data based at least in part on the plurality of sensor pulses to enable the sensor data to be used for navigating an autonomous vehicle.

For example, the sensor interface may create at least one of a header, footer, timestamp, or status bits for the received sensor data. In some aspects, the timestamp may indicate a timing of the received sensor data in relation to the local clock signal. More specifically, the timestamp may correspond with one of the plurality of sensor pulses that coincides with the time at which the sensor data was captured by the sensor apparatus.

In some aspects, the sensor data may be captured by the sensor apparatus in accordance with a sensor activation schedule based on the plurality of sensor pulses (e.g., as "time-synchronized" sensor data). In other aspects, the sensor data may be captured asynchronously be the sensor apparatus. Still further, in some aspects, the sensor data (e.g., including time-synchronized and/or asynchronous sensor data) may be combined to generate a three-dimensional sensor image that may be used for navigating the autonomous vehicle.

In some examples, the sensor synchronization system may determine a sensor activation schedule for activating each of the plurality of sensors such that each sensor activation coincides with one of the plurality of sensor pulses. The system may further transmit at least one of the plurality of sensor pulses to each of the plurality of sensors, in accordance with the sensor activation schedule, to activate the respective sensors.

Still further, in some examples, the sensor apparatus may correspond to a machine vision camera for an autonomous vehicle. For example, the plurality of sensors may include at least one of a camera or a laser rangefinder. Accordingly, the sensor synchronization system may generate a 3D sensor image for navigating the autonomous vehicle based at least in part on the sensor data.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Numerous examples are referenced herein in context of an autonomous vehicle. An autonomous vehicle refers to any vehicle which is operated in a state of automation with respect to steering and propulsion. Different levels of autonomy may exist with respect to autonomous vehicles. For example, some vehicles today enable automation in limited scenarios, such as on highways, provided that drivers are present in the vehicle. More advanced autonomous vehicles drive without any human driver inside the vehicle. Such vehicles often are required to make advance determinations regarding how the vehicle is behave given challenging surroundings of the vehicle environment.

As described herein, "time-synchronized sensor data" refers to sensor data that may be captured or acquired by respective sensors at the direction of a system controller (e.g., in response to triggers or activation commands) in synchronization with a local clock signal. For example, the capture of time-synchronized sensor data may be timed in accordance with a predetermined schedule known to the system controller. In contrast, "asynchronous sensor data" refers to sensor data that is not captured or acquired according to any known schedule. For example, the asynchronous sensor data may be captured by respective sensors that operate independently (e.g., not under the direct control of the system controller), and may thus be received at unpredictable times.

System Description

FIG. 1 shows a block diagram of a control system 100 for operating an autonomous vehicle in accordance with example implementations. The control system 100 includes a sensor synchronization controller 110, a system controller 120, and a vehicle interface subsystem (VIS) 90. In an example of FIG. 1, the control system 100 is used to autonomously operate a vehicle (not shown for simplicity) in a given geographic region for a variety of purposes, including transport services (e.g., transport of humans, delivery services, etc.). In examples described, an autonomously operated vehicle can drive and/or navigate without human intervention. For example, in the context of automobiles, an autonomously driven vehicle can steer, accelerate, shift, brake and operate lighting components. Some variations also recognize that an autonomous-capable vehicle can be operated autonomously, manually, or a combination of both.

In an example of FIG. 1, the control system 100 utilizes a number of sensor resources to intelligently guide or navigate the vehicle through a given environment. For example, the control system may include a number of sensor apparatuses (SA) 101, 103, and 105 that generate respective sensor data 111, 113, and 115. Each sensor apparatus may include one or more sensors that may capture a particular type of information about the surrounding environment. In an example of FIG. 1, the first sensor apparatus 101 may include a number of camera modules that can capture still images and/or videos (e.g., as sensor data 111); the second sensor apparatus 103 may include a laser rangefinder that can determine distance information to nearby objects (e.g., as sensor data 113) using laser ranging techniques; and the third sensor apparatus 105 may include an inertial measurement unit (IMU) that can detect velocity, orientation, and/or gravitational information (e.g., as sensor data 115) pertaining to the autonomous vehicle.

The control system 100 of FIG. 1 is not limited to the sensors described in the examples herein. In some implementations, the control system 100 may include fewer or more sensor apparatuses and/or types of sensors than described herein with respect to FIG. 1. For example, the control system 100 may further include proximity sensors, touch sensors, photosensors, sonar, radar, rotary encoders, and/or any other sensors technology that may be used to detect and/or gather information about the surrounding environment.

In example implementations, the sensor data 111-115 may be combined to provide a computerized perception of the space and environment surrounding the vehicle. For example, the first sensor apparatus 101 may correspond, at least in part, to a machine vision camera that can be used to generate a three-dimensional (3D) representation of the surrounding environment. For example, still images (e.g., included with sensor data 111) from multiple camera modules of the first sensor apparatus 101 may be "stitched" together to generate a 3D (e.g., stereoscopic) sensor image. The 3D sensor image may indicate the size and distance of objects in the vicinity of the autonomous vehicle (e.g., within viewable range of the sensor apparatus 101). In order to generate an accurate 3D sensor image of the environment at any given time, the machine vision camera relies on sensor data that was captured or acquired at that particular instance of time. Attempting to synthesize multiple images captured at different instances of time may result in optical distortions in the 3D sensor image.

Conventional machine vision cameras operate in an asynchronous manner. For example, individual camera modules may capture images at various times and/or framerates independent of other camera modules within the machine vision camera. Thus, a processor of the machine vision camera would typically have to determine and resolve any discrepancies in the timing of sensor data received from each of the camera modules before it can use the sensor data to construct a 3D sensor image. This process becomes even less efficient as the demand for sensor data increases (e.g., due to increased framerates and/or number of camera modules). Therefore, conventional machine vision cameras may not be efficient or accurate enough for creating real-time 3D sensor images that can be used to safely navigate an autonomous vehicle, especially at high speeds (e.g., 60+ mph).

The example implementations recognize that, in order to satisfy the machine vision demands of autonomous vehicles, it may be desirable to capture sensor data from multiple sensors in a time-synchronized manner. Thus, in example implementations, activation of at least some of the sensor apparatuses 101, 103, and 105 (e.g., to capture or acquire sensor data) may be directly controlled by the control system 100 and/or sensor synchronization controller 110. In an example of FIG. 1, sensor apparatuses 101 and 103 may capture sensor data 111 and 113 in response to triggers 112 and 114, respectively, from the sensor synchronization controller 110. As described in greater detail below with respect to FIGS. 4A-4C, the triggers 112 and 114 may cause individual sensors of the sensor apparatuses 101 and 103 to capture respective sensor data in a time-synchronized manner.

In some implementations, the sensor synchronization controller 110 may send the triggers 112 and 114 to the respective sensor apparatuses 101 and 103 in accordance with a sensor activation schedule. For example, the sensor activation schedule may be a predetermined schedule for activating the sensor apparatuses 101 and 103. More specifically, the sensor activation schedule may indicate what sensors are to be activated at what times. The sensor activation schedule may be user configured or programmatically generated by the control system 100, for example, based on one or more operating parameters of the autonomous vehicle (e.g., vehicle speed, vehicle function, desired framerate or resolution, etc.). In some aspects, the sensor activation schedule may be synchronized with a local clock signal (CLK) 126 of the control system 100. For example, the local clock signal 126 may be a shared clock signal that is used by other components and/or elements of the control system 100 for timing purposes. Synchronizing the sensor activation schedule with the local clock signal 126 allows the timing of the sensor data 111 and/or 113 to be quickly determined with respect to a common reference timing signal.

In some aspects, one or more sensors of the first sensor apparatus 101 may capture sensor data at substantially the same time as other sensors of the first sensor apparatus 101. In other aspects, at least some of the sensor data 111 captured by the first sensor apparatus 101 may coincide, temporally, with at least some of the sensor data 113 captured by the second sensor apparatus 103. The time-synchronized sensor data 111 and/or 113 may be quickly and accurately combined to generate 3D sensor images that can be used for navigating the autonomous vehicle. Moreover, by controlling the precise times at which the sensor data 111 and/or 113 is captured (e.g., according to a sensor activation schedule), the control system 100 may reliably update the 3D sensor image even when the vehicle is travelling at high speeds.

The example implementations further recognize that the control system 100 may include one or more asynchronous sensors (e.g., sensor apparatus 105). For example, the third sensor apparatus 105 may not respond to triggers from the sensor synchronization controller 110. Rather, the asynchronous sensor apparatus 105 may capture sensor data 115 at preconfigured rates and/or times (e.g., in reaction to changes in the environment, based on its own internal clock, in response to manual input, etc.). In example implementations, the sensor synchronization controller 110 may determine a relative timing of the asynchronous sensor data 115 with respect to the local clock signal 126. This may enable the sensor data 115 to be used by other processors and/or components of the control system 100. For example, the sensor data 115 may be combined with similarly-timed sensor data 111 and/or 113 to generate a 3D sensor image at the given instance of time.

The sensor synchronization controller 110 may correspond to a dedicated processing resource, such as a field programmable gate array ("FPGA"), that receives and/or processes raw sensor data 111-115 received from the sensor apparatuses 101-105. More specifically, the sensor synchronization controller 110 may convert the raw sensor data 111-115 to clock-synchronized (CS) sensor data 117. In example implementations, the CS sensor data 117 may be formatted for a particular communications platform implemented by the control system 100. In some aspects, the sensor synchronization controller 110 may convert the raw sensor data 111-115 into a platform-specific format (e.g., as CS sensor data 117) by adding a timestamp to the sensor data indicating the time at which the corresponding sensor data is captured or acquired in relation to the local clock signal 126. For example, the timestamp may be based on a sensor activation schedule used to trigger activation of individual sensors in the sensor apparatuses 101 and/or 103. In another example, the timestamp may be based on a phase or timing of the local clock signal 126 when the sensor data 115 is acquired. Still further, in some aspects, the sensor synchronization controller 110 may add additional parameters or fields (e.g., header, footer, status bit, etc.) to the raw sensor data 111-115 when converting the sensor data to CS sensor data 117.

The system controller 120 may utilize the CS sensor data 117 to intelligently guide or navigate the vehicle through a given environment. For example, the system controller 120 may control operations of the vehicle such as steering, accelerating, and braking as the vehicle progresses to a destination. In some aspects, the system controller 120 may trigger vehicle control actions (e.g., braking, steering, accelerating) and/or perform route planning based at least in part on the CS sensor data 117. In other aspects, the system controller 120 may use the CS sensor data 117 to provide additional inputs for the vehicle (e.g., transmissions from remote or local human operators, network communication from other vehicles, etc.). Still further, in some aspects, the system controller 120 may communicate the CS sensor data 117 to one or more remote devices.

In example implementations, the system controller 120 includes sensor mapping logic 122 and vehicle control logic 128. In some aspects, the system controller 120 may also include clock generation circuitry 124 to generate the local clock signal 126 to be used by other elements of the control system 100 (e.g., for timing purposes). The sensor mapping logic 122 creates a sensor model 125 based on the CS sensor data 117. More specifically, the sensor mapping logic 122 may combine CS sensor data 117 from multiple sensor apparatuses 101, 103, and/or 105 to create a more detailed description of the surrounding environment (e.g., provided as the sensor model 125) that can be used to more effectively navigate the vehicle through the environment. For example, the sensor model 125 may include information pertaining to detected objects in the vicinity of the vehicle and/or contextual information about the object, surroundings, and/or geographic region, for purposes of making predictive determinations to avoid collisions.

In some aspects, the sensor model 125 may include a 3D sensor image of the surrounding environment. For example, the 3D sensor image may include image data, captured by multiple camera modules (e.g., of sensor apparatus 101), stitched together to create stereoscopic images of the surrounding environment. The stereoscopic images may be used to detect the presence and/or distances of objects in the vicinity of the vehicle. In some examples, the image data may be combined with laser rangefinder data to produce a more complete picture of the surrounding environment. In some aspects, the laser rangefinder data may complement the image data for purposes of detecting objects that may not be detectable from the image data alone. In other aspects, the laser rangefinder data may be used to check or validate the image data, and vice-versa.

The vehicle control logic 128 generates vehicle commands (CV) 85 based at least in part on the sensor model 125. More specifically, the vehicle control logic 128 may control the vehicle by issuing instructions and data (e.g., vehicle commands 85) that programmatically control various electromechanical interfaces of the vehicle. The vehicle commands 85 can serve to control operational aspects of the vehicle, including propulsion, braking, steering, and auxiliary behavior (e.g., turning lights on). In example implementations, the vehicle control logic 128 utilizes the sensor model 125 to navigate the vehicle through a given environment (e.g., by issuing respective vehicle commands 85). For example, the vehicle commands 85 may specify actions that correlate to one or multiple vehicle control mechanisms (e.g., steering mechanism, brakes, etc.). More specifically, the vehicle commands 85 may specify the actions, along with attributes such as magnitude, duration, directionality or other operational characteristic of the vehicle 10.

The vehicle interface subsystem 90 processes the vehicle commands 85 to control one or more operations of the vehicle. The vehicle interface subsystem 90 may include one or more vehicle controllers 84 that process and/or carry out the vehicle commands 85 issued by the vehicle control logic 128. More specifically, the vehicle controllers 84 may process the vehicle commands 85 as inputs to control propulsion, steering, braking, and/or other mechanical (or electrical) behavior of the vehicle. For example, while the vehicle follows a particular route, the controllers 84 may continuously adjust and/or alter the movement of the vehicle in response to vehicle commands 85 provided (e.g., in real-time) by the vehicle control logic 128.

In example implementations, the controllers 84 translate the vehicle commands 85 into control signals (CS) 119 for respective interfaces of the vehicle interface subsystem 90. For example, the vehicle interface subsystem 90 may include: a propulsion interface 92 to electrically (or through programming) control a propulsion component (e.g., a gas pedal), a steering interface 94 for a steering mechanism, a braking interface 96 for a braking component, and lighting/auxiliary interface 98 for exterior lights of the vehicle. The control signals 119 may be electrical signals that correlate to the specified vehicle action by virtue of electrical characteristics that have attributes for magnitude, duration, frequency or pulse, or other electrical characteristics.

Figure 2:
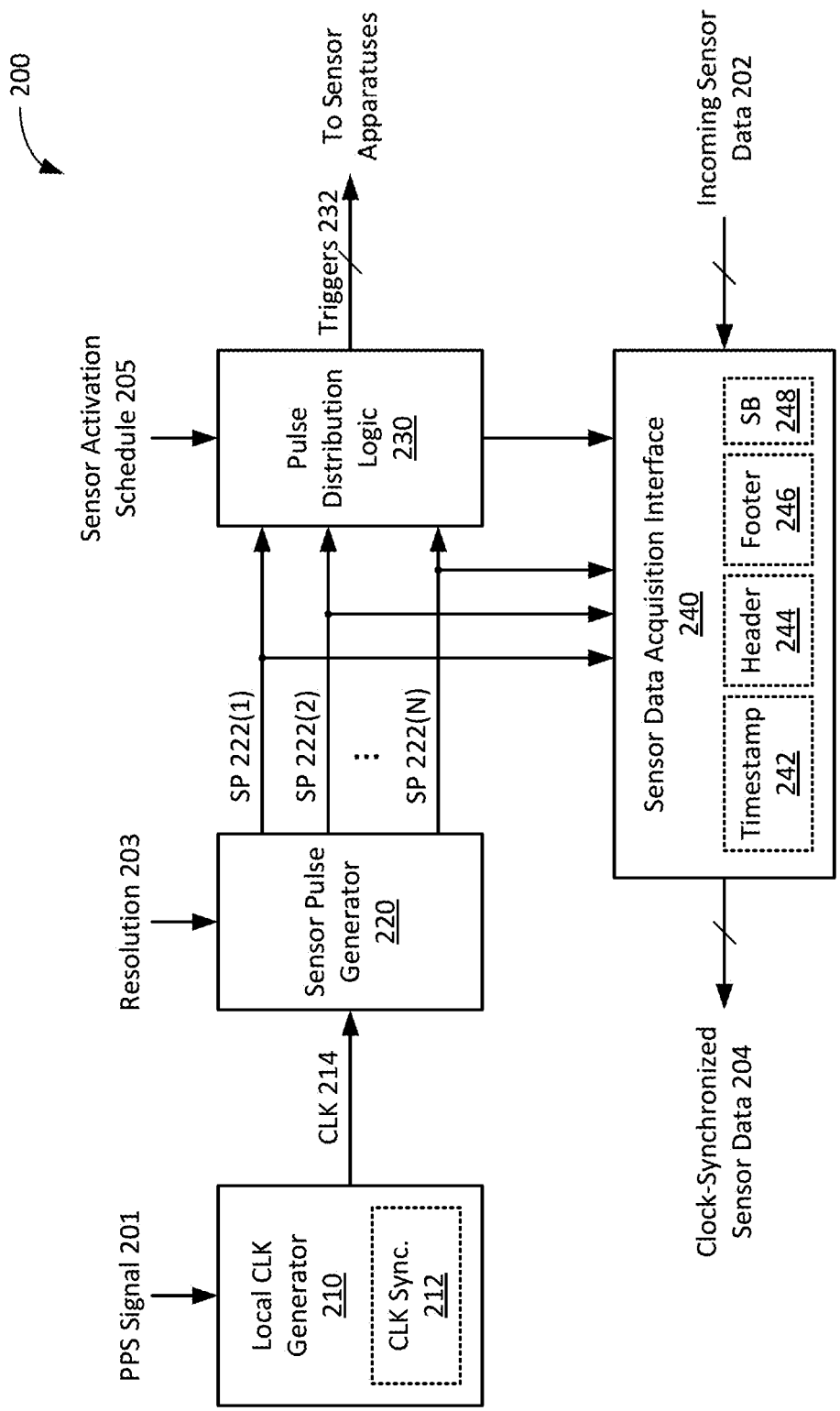
FIG. 2 shows a block diagram of a sensor synchronization system that may be used to synchronize sensor data across multiple sensors and sensor apparatuses.

FIG. 2 shows a block diagram of a sensor synchronization system 200 that may be used to synchronize sensor data across multiple sensors and sensor apparatuses. The sensor synchronization system 200 includes a local clock signal (CLK) generator 210, a sensor pulse generator 220, pulse distribution logic 230, and a sensor data acquisition interface 240. In example implementations, the sensor synchronization system 200 may be used to capture time-synchronized sensor data (e.g., by triggering activation of sensor apparatuses 101 and 103 of the control system 100) and/or determine timing information for asynchronous sensor data (e.g., received from sensor apparatus 105 of the control system 100).

The local CLK generator 210 generates a local clock signal 214 that may be used for timing purposes by other elements and/or components of an autonomous vehicle. More specifically, the local clock signal 214 may serve as a reference timing signal for synchronizing various components of the autonomous vehicle. In some implementations, the local CLK generator 210 may generate the local clock signal 214 based on an external timing signal. For example, the external timing signal may be a pulse per second (PPS) signal 201 received from a global positioning satellite (GPS) receiver (not shown). The PPS signal 201 may be a highly accurate and reliable external timing signal (e.g., derived from satellite signals) with which to align the local clock signal 214.

In some aspects, the local CLK generator 210 may include CLK synchronization circuitry 212 to periodically adjust or align a phase of the local clock signal 214 with a phase of the PPS signal 201. For example, the CLK synchronization circuitry 212 may perform the phase alignment each time a new pulse is received on the PPS signal 201 (e.g., every second). In some implementations, the CLK synchronization circuitry 212 may include a phase-locked loop (PLL) that generates the local clock signal 214 based at least in part on the PPS signal 201. More specifically, the PLL circuit may lock the phase of the local clock signal 214 to the phase of the PPS signal 201.

The sensor pulse generator 220 generates a number of sensor pulses (SP) 222(1)-222(N) based on the local clock signal 214. In example implementations, each of the sensor pulses 222(1)-222(N) may be offset in phase, relative to the local clock signal 214, by a respective amount. Because the sensor pulses 222(1)-222(N) are generated based on the local clock signal CLK, the sensor pulse generator 220 may update the sensor pulses 222(1)-222(N) in response to changes to the local clock signal CLK. Furthermore, the number (N) of sensor pulses 222(1)-222(N) generated, per clock cycle of the local clock signal 214, may depend on a desired granularity of timing. For example, a higher granularity (e.g., corresponding to more sensor pulses) may yield more precise timing information.

In some implementations, the granularity of timing may correspond, at least in part, with a resolution 203 of one or more sensor apparatuses. The resolution 203 may correspond to a desired rate (e.g., framerate) or amount of sensor activity to be captured within a given clock cycle of the local clock signal 124. In some aspects, the resolution 203 may be a user-configured input. In other aspects, the resolution 203 may be programmatically determined, at least in part, based on one or more operating parameters of the autonomous vehicle (e.g., vehicle speed, vehicle function, GPS coordinates, etc.).

Figure 3:
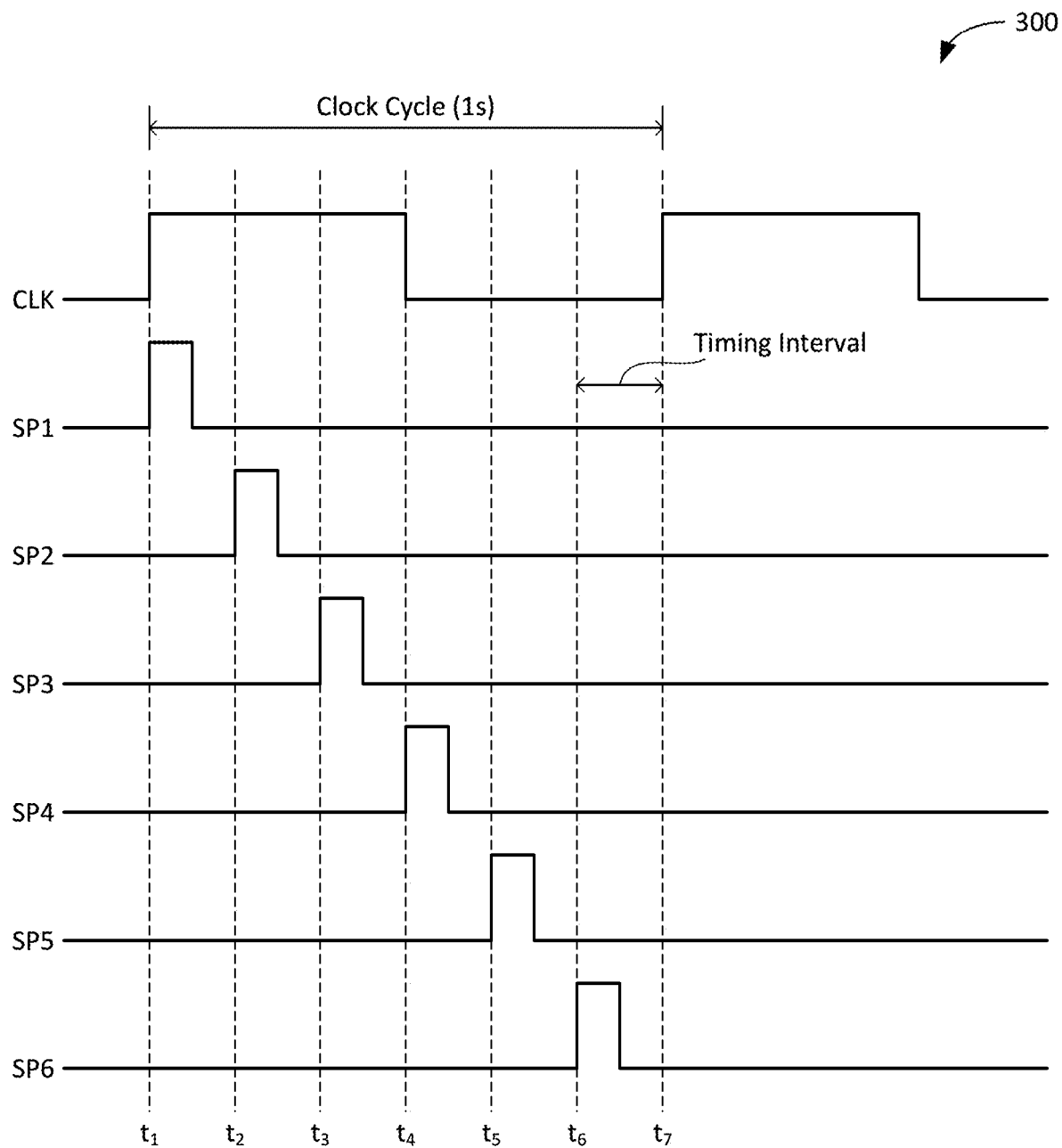
FIG. 3 shows a timing diagram depicting an example method for generating a number of sensor pulses based on a local clock signal.

FIG. 3 shows a timing diagram 300 depicting an example method for generating a number of sensor pulses based on a local clock signal. In the example of FIG. 3, the desired resolution 203 may be six frames per second. As described above, the local clock signal CLK may be synchronized with a PPS signal 201, and therefore has a clock cycle of one second (e.g., from times $t_1$ to $t_7$). Thus, the sensor pulse generator 220 may generate six sensor pulses SP1-SP6 for every clock cycle of the local clock signal. For example, the sensor pulse generator 220 may divide the clock cycle of the local clock signal CLK into six timing intervals of equal duration.

The sensor pulse generator 220 may generate the sensor pulses SP1-SP6 such that each sensor pulse coincides with a corresponding timing interval. Accordingly, the first sensor pulse is asserted and/or aligned with the start of the first timing interval (e.g., at time $t_1$); the second sensor pulse is asserted and/or aligned with the start of the second timing interval (e.g., at time $t_2$); the third sensor pulse is asserted and/or aligned with the start of the third timing interval (e.g., at time $t_3$); the fourth sensor pulse is asserted and/or aligned with the start of the fourth timing interval (e.g., at time $t_4$); the fifth sensor pulse is asserted and/or aligned with the start of the fifth timing interval (e.g., at time $t_5$); and the sixth sensor pulse is asserted and/or aligned with the start of the sixth timing interval (e.g., at time $t_6$). Each successive sensor pulse is offset in phase from the preceding sensor pulse by exactly one timing interval. In other words, with respect to the local clock signal CLK, SP1 is in-phase, SP2 is phase offset by 1 timing interval (~166 ms), SP3 is phase offset by 2 timing intervals (~333 ms), SP4 is phase offset by 3 timing intervals (~500 ms), SP5 is phase offset by 4 timing intervals (~666 ms), and SP6 is phase offset by 5 timing intervals (~833 ms). Thus, the timing of each of the sensor pulses may be determined from the timing of the local clock signal CLK.

The pulse distribution logic 230 controls the activation of one or more sensors (e.g., to capture sensor data at a given instance in time) based at least in part on the sensor pulses 222(1)-222(N). In example implementations, the pulse distribution logic 230 may package or distribute one or more of the sensor pulses 222(1)-222(N) as triggers 232 for activating each of a plurality of sensors. In some aspects, the pulse distribution logic 230 may send a respective trigger 232 (e.g., that includes one or more of the sensor pulses 222(1)-222(N)) to each sensor in accordance with a sensor activation schedule 205. As described above, the sensor activation schedule 205 may be a predetermined schedule for activating one or more sensors of a sensor apparatus (e.g., indicating which sensors are to be activated at what times). Moreover, the sensor activation schedule 205 may be user configured or programmatically generated based, at least in part, on one or more operating parameters of the autonomous vehicle (e.g., vehicle speed, desired sensor framerate or resolution, etc.).

Table 1 shows an example sensor activation schedule that may be used to trigger and/or control activation of six individual camera modules (C1-C6) of a machine vision camera. With reference to Table 1, a "1" indicates that the camera is to be activated at the given instance of time, whereas a "0" indicates that the camera is not to be activated at the given time. The sensor activation schedule below shows the sensor activation times for a single clock cycle of a local clock signal. In some aspects, the sensor activation schedule of Table 1 may be repeated or reused for subsequent clock cycles of the local clock signal. In other aspects, the sensor activation schedule of Table 1 may be modified or substituted for other sensor activation schedules in subsequent clock cycles.

TABLE 1

| Time | C1 | C2 | C3 | C4 | C5 | C6 | SP |
|------|----|----|----|----|----|----|-----|
| $t_1$ | 1 | 1 | 1 | 1 | 1 | 1 | SP1 |
| $t_2$ | 1 | 1 | 1 | 1 | 1 | 1 | SP2 |
| $t_3$ | 1 | 1 | 1 | 1 | 1 | 1 | SP3 |
| $t_4$ | 1 | 1 | 1 | 1 | 1 | 1 | SP4 |
| $t_5$ | 1 | 1 | 1 | 1 | 1 | 1 | SP5 |
| $t_6$ | 1 | 1 | 1 | 1 | 1 | 1 | SP6 |

In the example sensor activation schedule of Table 1, each of the camera modules C1-C6 is scheduled to capture sensor (e.g., image) data at each interval of a clock cycle, from times $t_1$-$t_6$. In other words, the framerate of each of the camera modules C1-C6 is 6 frames per second. Thus, in order to capture time-synchronized sensor data from each of the camera modules C1-C6 at the desired framerate, the pulse distribution logic 230 may provide or distribute the six sensor pulses SP1-SP6 to each of the camera modules C1-C6. For example, each camera module may receive a respective trigger 232 that includes the sensor pulses SP1, SP2, SP3, SP4, SP5, and SP6, causing each camera module to capture image data at times $t_1$, $t_2$, $t_3$, $t_4$, $t_5$, and $t_6$, respectively.

Figure 4A:
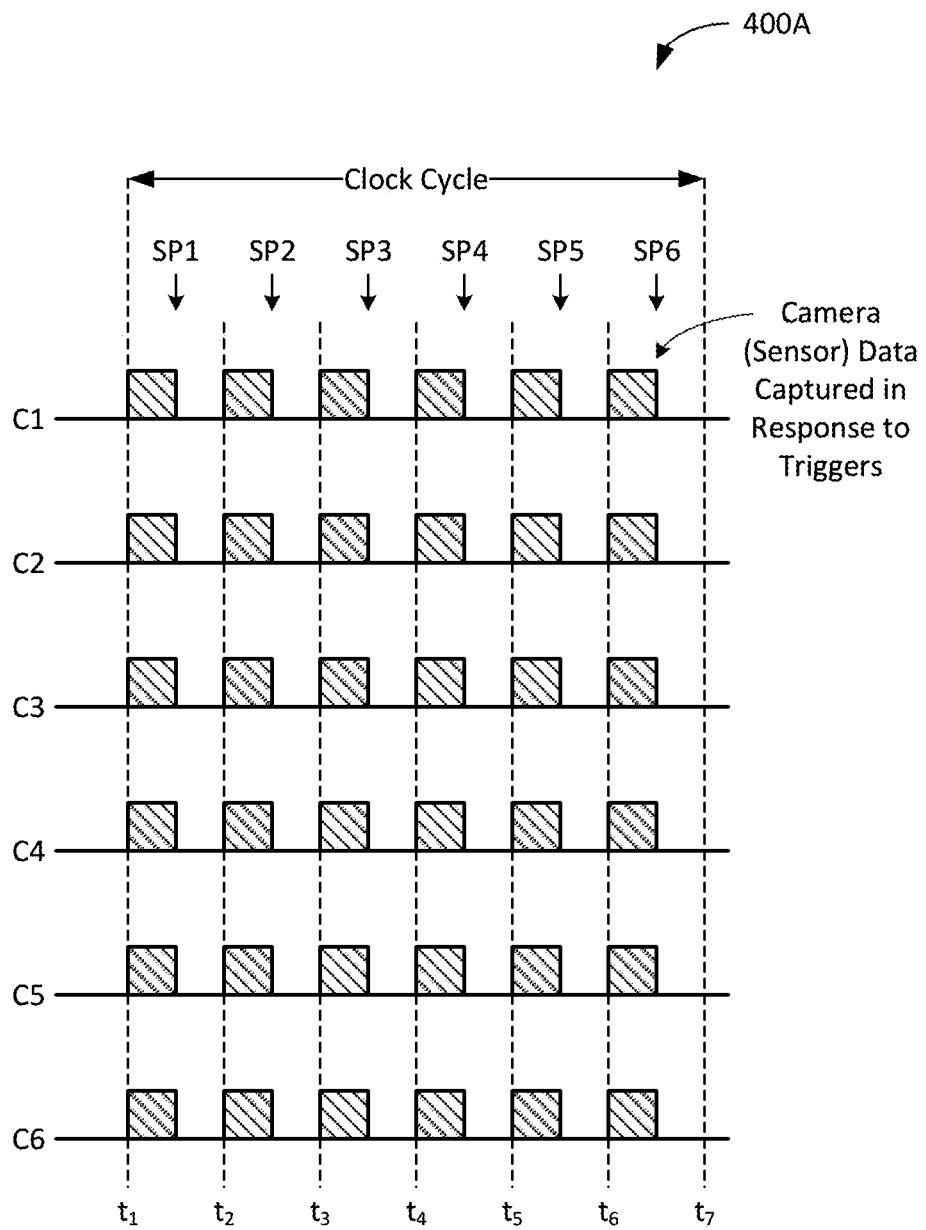
FIGS. 4A-4C show timing diagrams depicting example methods for triggering time-synchronized capture of sensor data.

FIG. 4A shows a timing diagram 400A depicting an example implementation of the sensor activation schedule of Table 1 for a single clock cycle of a local clock signal (e.g., from times $t_1$-$t_7$). For example, at time $t_1$, each of the camera modules C1-C6 captures respective sensor data in response to the first sensor pulse SP1; at time $t_2$, each of the camera modules C1-C6 captures respective sensor data in response to the second sensor pulse SP2; at time $t_3$, each of the camera modules C1-C6 captures respective sensor data in response to the third sensor pulse SP3; at time $t_4$, each of the camera modules C1-C6 captures respective sensor data in response to the fourth sensor pulse SP4; at time $t_5$, each of the camera modules C1-C6 captures respective sensor data in response to the fifth sensor pulse SP5; and at time $t_6$, each of the camera modules C1-C6 captures respective sensor data in response to the sixth sensor pulse SP6.

As shown in the example of FIG. 4A, at any given time $t_1$-$t_6$, the sensor data captured by each of the camera modules C1-C6 is time-synchronized (e.g., aligned temporally). Because the timing of the sensor pulses SP1-SP6 is known (e.g., with respect to the local clock signal CLK), and because the camera modules C1-C6 are activated in accordance with a predetermined (e.g., fixed) sensor activation schedule, the timing of the sensor data from each of the camera modules C1-C6 may be accurately and reliably determined by a control system for an autonomous vehicle. This enables the sensor data to be quickly and accurately combined to generate 3D sensor images (e.g., in real-time) that can be used for navigating an autonomous vehicle.

In some implementations, some of the camera modules C1-C6 may operate at different times and/or framerates. For example, certain sensors may be more critical to the vehicle's operations, and therefore require higher resolution, than other sensors. Moreover, an autonomous vehicle may include a vast number of sensors (e.g., 20+ camera modules) that assist with vehicle navigation and/or other functions. Attempting to capture sensor data from all of the sensors at the same time may create a bottleneck in the vehicle's control system (e.g., depending on the bandwidth or capacity of the vehicle's communications infrastructure, processors, and/or memory). Thus, in some instances, it may be desirable to offset the activation of individual sensors to prevent overloading the communications bandwidth of the vehicle control system.

Table 2 shows an example sensor activation schedule that may be used to operate camera modules C1 and C2 at 3 frames per second while operating camera modules C3-C6 operate at 2 frames per second. The timing of camera modules C3 and C4 may be offset relative to the timing of camera modules C5 and C6, for example, to avoid bottlenecks in the communication of sensor data. With reference to Table 2, a "1" indicates that the camera is to be activated at the given instance of time, whereas a "0" indicates that the camera is not to be activated at the given time. The sensor activation schedule below shows the sensor activation times for a single clock cycle of a local clock signal. In some aspects, the sensor activation schedule of Table 2 may be repeated for subsequent clock cycles of the local clock signal. In other aspects, the sensor activation schedule of Table 2 may be modified or substituted for other sensor activation schedules in subsequent clock cycles.

TABLE 2

| Time | C1 | C2 | C3 | C4 | C5 | C6 | SP |
|---|---|---|---|---|---|---|---|
| $t_1$ | 1 | 1 | 0 | 0 | 0 | 0 | SP1 |
| $t_2$ | 0 | 0 | 1 | 1 | 0 | 0 | SP2 |
| $t_3$ | 1 | 1 | 0 | 0 | 1 | 1 | SP3 |
| $t_4$ | 0 | 0 | 0 | 0 | 0 | 0 | SP4 |
| $t_5$ | 1 | 1 | 1 | 1 | 0 | 0 | SP5 |
| $t_6$ | 0 | 0 | 0 | 0 | 1 | 1 | SP6 |

In the example sensor activation schedule of Table 2, each of the camera modules C1 and C2 is scheduled to capture sensor (e.g., image) data three times per clock cycle (e.g., 3 frames per second), at times $t_1$, $t_3$, and $t_5$. Each of the camera modules C3 and C4 is scheduled to capture sensor data twice per clock cycle (e.g., 2 frames per second), at times $t_2$ and $t_5$; and each of the camera module C5 and C6 is scheduled to captures sensor data twice per clock cycle (e.g., 2 frames per second), at times $t_3$ and $t_6$. Accordingly, the pulse distribution logic 230 may provide or distribute the first sensor pulse SP1 to camera modules C1 and C2, the second sensor pulse SP2 to camera modules C2 and C3, the third sensor pulse SP3 to camera modules C1, C2, C5, and C6, the fifth sensor pulse SP5 to camera modules C1-C4, and the sixth sensor pulse SP6 to camera modules C5 and C6. Because no camera module is activated at time $t_4$, the fourth sensor pulse SP4 may not be distributed to any of the camera modules C1-C6.

Figure 4B:
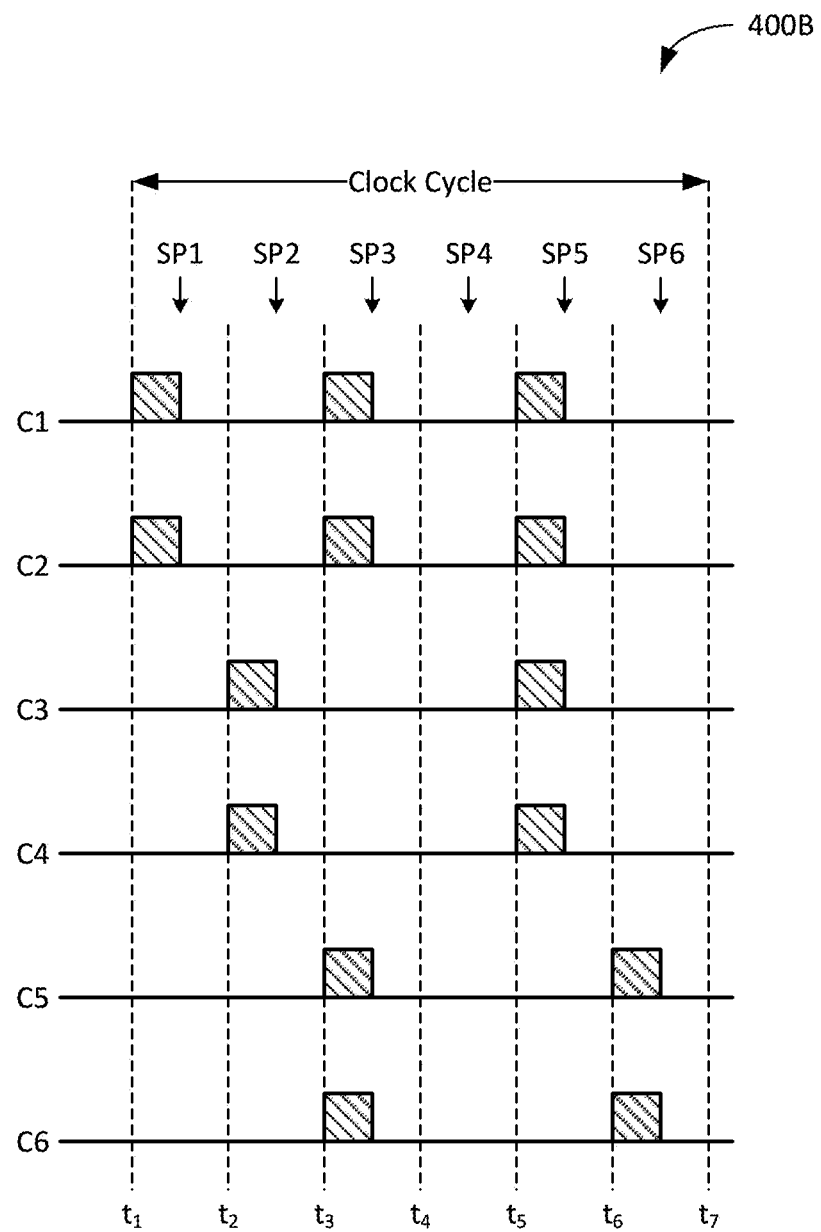

FIG. 4B shows a timing diagram 400B depicting an example implementation of the sensor activation schedule of Table 2 for a single clock cycle of a local clock signal (e.g., from times $t_1$-$t_7$). For example, at time $t_1$, each of the camera modules C1 and C2 captures respective sensor data in response to the first sensor pulse SP1; at time $t_2$, each of the camera module C3 and C4 captures respective sensor data in response to the second sensor pulse SP2; at time $t_3$, each of the camera modules C1, C2, C5, and C6 captures respective sensor data in response to the third sensor pulse SP3; at time $t_5$, each of the camera modules C1-C4 captures respective sensor data in response to the fifth sensor pulse SP5; and at time $t_6$, each of the camera modules C5 and C6 captures respective sensor data in response to the sixth sensor pulse SP6. No sensor data is captured at time $t_4$.

As shown in the example of FIG. 4B, sensor data captured by camera modules C1 and C2 may be combined to generate 3D sensor images at times $t_1$, $t_3$, and $t_5$; sensor data captured by camera modules C3 and C4 may be combined to generate 3D sensor images at times $t_2$ and $t_5$; and sensor data captured by camera modules C5 and C5 may be combined to generate 3D sensor images at times $t_3$ and $t_6$. Still further, at time $t_3$, the sensor data captured by camera modules C1 and C2 coincides (e.g., is time-synchronized) with the sensor data captured by camera modules C5 and C6. Thus, in some aspects, the sensor data captured by camera modules C1, C2, C5, and C6 may be combined to generate a more detailed and/or complete 3D sensor image at time $t_3$. Similarly, at time $t_5$, the sensor data captured by camera modules C1 and C2 coincides with the sensor data captured by camera modules C3 and C4. Thus, in some aspects, the sensor data captured by camera modules C1-C4 may be combined to generate a more detailed and/or complete 3D sensor image at time $t_5$.

Still further, in some implementations, a timing schedule may describe sensor activation times for multiple sensor apparatuses and/or sensors of different types. For example, in some aspects, it may be desirable to schedule the capture of camera data in synchronization with the capture laser rangefinder data (e.g., to generate a more complete 3D sensor image and/or use one type of sensor data to check or verify the information derived from the other type of sensor data).

Table 3 shows an example sensor activation schedule that may be used to operate each of the camera modules C1-C6 at 1 frame per second while concurrently operating a laser rangefinder (LR) at 6 frames per second. The timing of each of the camera modules C1-C6 may be offset, for example, to avoid bottlenecks in the communication of sensor data. With reference to Table 3, a "1" indicates that a corresponding sensor is to be activated at the given instance of time, whereas a "0" indicates that the sensor is not to be activated at the given time. The sensor activation schedule below shows the sensor activation times for a single clock cycle of a local clock signal. In some aspects, the sensor activation schedule of Table 3 may be repeated for subsequent clock cycles of the local clock signal. In other aspects, the sensor activation schedule of Table 3 may be modified or substituted for other sensor activation schedules in subsequent clock cycles.

TABLE 3

| Time | C1 | C2 | C3 | C4 | C5 | C6 | LR | SP |
|---|---|---|---|---|---|---|---|---|
| $t_1$ | 1 | 0 | 0 | 0 | 0 | 0 | 1 | SP1 |
| $t_2$ | 0 | 1 | 0 | 0 | 0 | 0 | 1 | SP2 |
| $t_3$ | 0 | 0 | 1 | 0 | 0 | 0 | 1 | SP3 |
| $t_4$ | 0 | 0 | 0 | 1 | 0 | 0 | 1 | SP4 |

TABLE 3-continued

| Time | C1 | C2 | C3 | C4 | C5 | C6 | LR | SP |
|------|----|----|----|----|----|----|----|----|
| $t_5$ | 0 | 0 | 0 | 0 | 1 | 0 | 1 | SP5 |
| $t_6$ | 0 | 0 | 0 | 0 | 0 | 1 | 1 | SP6 |

In the example sensor activation schedule of Table 3, each of the camera modules C1, C2, C3, C4, C5, and C6 is scheduled to capture sensor (e.g., image) data once per clock cycle (e.g., 1 frame per second), at times $t_1$, $t_2$, $t_3$, $t_4$, $t_5$, and $t_6$, respectively. In addition, the laser rangefinder is scheduled to capture sensor (e.g., distance) data six times per clock cycle (e.g., 6 frames per second), at each time interval from times $t_1$-$t_6$. Accordingly, the pulse distribution logic 230 may provide or distribute the first sensor pulse SP1 to the laser rangefinder and camera module C1, the second sensor pulse SP2 to the laser rangefinder and camera module C2, the third sensor pulse SP3 to the laser rangefinder and camera module C3, the fourth sensor pulse SP4 to the laser rangefinder and camera module C4, the fifth sensor pulse SP5 to the laser rangefinder and camera module C5, and the sixth sensor pulse SP6 to the laser rangefinder and camera module C6.

Figure 4C:
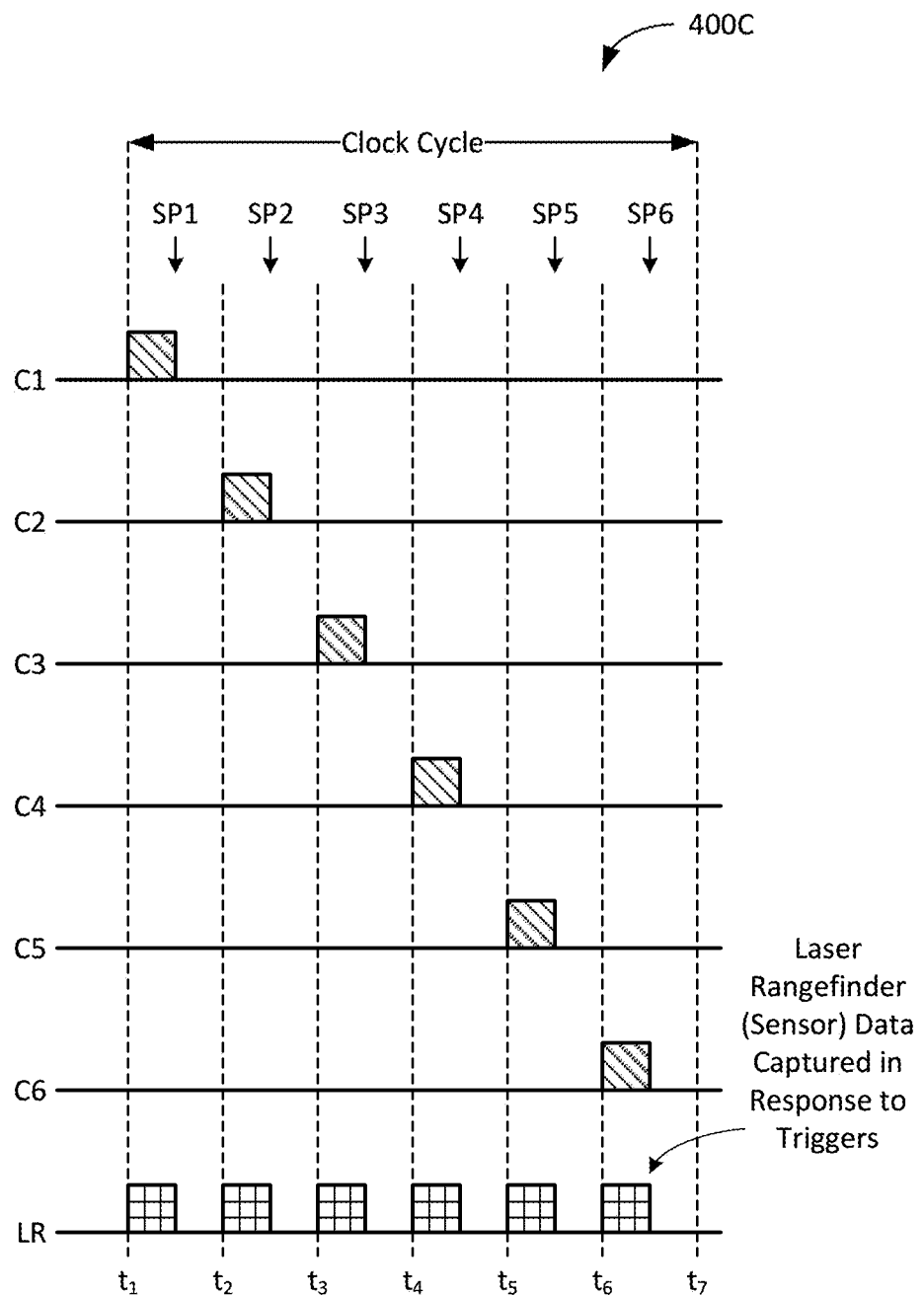

FIG. 4C shows a timing diagram 400C depicting an example implementation of the sensor activation schedule of Table 3 for a single clock cycle of a local clock signal (e.g., from times $t_1$-$t_7$). For example, at time $t_1$, the laser rangefinder and camera module C1 capture respective sensor data in response to the first sensor pulse SP1; at time $t_2$, the laser rangefinder and camera module C2 capture respective sensor data in response to the second sensor pulse SP2; at time $t_3$, the laser rangefinder and camera module C3 capture respective sensor data in response to the third sensor pulse SP3; at time $t_4$, the laser rangefinder and camera module C4 capture respective sensor data in response to the fourth sensor pulse SP4; at time $t_5$, the laser rangefinder and camera module C5 capture respective sensor data in response to the fifth sensor pulse SP5; and at time $t_6$, the laser rangefinder and camera module C6 capture respective sensor data in response to the sixth sensor pulse SP6.

As shown in the example of FIG. 4C, image data captured by camera module C1, C2, C3, C4, C5, and C6 may be combined with respective distance data captured by the laser rangefinder to generate 3D sensor images at time $t_1$, $t_2$, $t_3$, $t_4$, $t_5$, and $t_6$, respectively. As described above, in some aspects, the distance data captured by the laser rangefinder may be used to check or verify information (e.g., size and/or distance of objects) derived from corresponding camera data captured by a respective one of the cameras C1-C6 at any given time.

In the example of FIG. 4C, the laser rangefinder is shown to operate in response to triggers (e.g., sensor pulses) from the pulse distribution logic 230. However, for some implementations, the laser rangefinder may capture distance data at a predetermined sampling rate (e.g., 1 Hz) which may not be adjustable and/or controllable by the sensor synchronization system 200. Thus, the example implementations further recognize that it may be desirable to acquire timing information for such asynchronous sensor data, for example, to enable the distance data captured by the laser rangefinder to be combined with corresponding image data captured by the camera modules C1-C6 to generate an accurate 3D sensor image.

Referring back to the example of FIG. 2, the sensor data acquisition interface 240 may process incoming sensor data 202 received from one or more sensor apparatuses. In example implementations, the sensor data acquisition interface 240 may convert the incoming sensor data 202 into clock-synchronized sensor data 204. In some aspects, the sensor data acquisition interface 240 may determine a timing of the incoming sensor data 202 in relation to the local clock signal 214. The timing information may be provided with the clock-synchronized sensor data 204 to enable the corresponding sensor data to be used for vehicle navigation and/or controlling one or more functions or operations of an autonomous vehicle. For example, as described above, the times at which sensor data is captured or acquired may be an important component for generating an accurate 3D sensor image based on the sensor data. Combining mismatched sensor data (e.g., sensor data that is not temporally aligned) may lead to optical distortions or artifacts in the resulting 3D sensor image.

In some examples, the incoming sensor data 202 may include time-synchronized sensor data captured in response to triggers 232 from the pulse distribution logic 230 (e.g., as described above with respect to FIGS. 4A-4C). The interface 240 may determine timing information for the time-synchronized sensor data, for example, by referencing the sensor activation schedule 205. As described above, the sensor activation schedule 205 may indicate the precise data capture (e.g., sensor activation) times, in relation to the local clock signal 214, of any time-synchronized sensor data.

In other examples, the incoming sensor data 202 may include asynchronous sensor data that may not be captured in response to triggers 232 from the sensor synchronization system 200. The interface 240 may determine timing information for the asynchronous sensor data, for example, by comparing the incoming sensor data 202 with the plurality of sensor pulses 222(1)-222(N). More specifically, the interface 240 may determine which of the sensor pulses 222(1)-222(N) most closely coincides with the time at which the asynchronous sensor data is captured or acquired (e.g., received by the sensor data acquisition interface 240). Since each of the sensor pulses 222(1)-222(N) is offset in phase relative to the local clock signal 214 by a predetermined amount, the interface 240 may quickly determine the relative timing of any incoming asynchronous sensor data (e.g., in relation to the local clock signal 214) based on the comparison.

Figure 5:
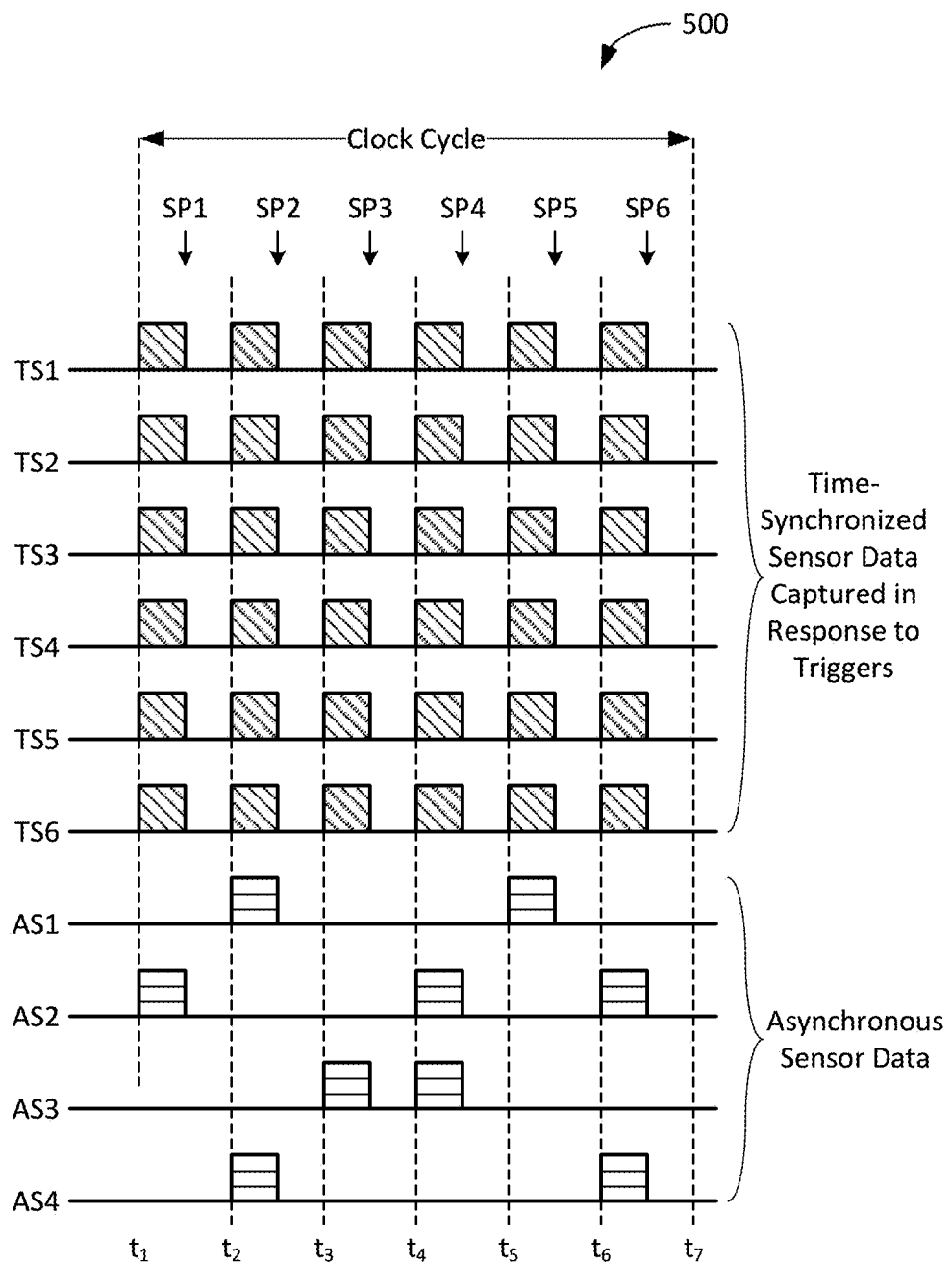
FIG. 5 shows a timing diagram depicting an example method for determining a timing of asynchronous sensor data in relation to a local clock signal.

FIG. 5 shows a timing diagram 500 depicting an example method for determining a timing of asynchronous sensor data in relation to a local clock signal that may be implemented by the sensor data acquisition interface 240 of FIG. 2. In an example of FIG. 5, the interface 240 may receive incoming sensor data 202 from six time-synchronized sensors TS1-TS6 that and four asynchronous sensors AS1-AS4. Activation of the time synchronized sensors TS1-TS6 may be directly controlled by the sensor synchronization system 200 (e.g., in accordance with a predetermined sensor activation schedule 205). In contrast, the activation times of the asynchronous sensors AS1-AS4 may not be controllable by the sensor synchronization system 200 (but rather, in reaction to changes in the environment and/or an asynchronous sensor's own internal clock).

Each of the time-synchronized sensors TS1-TS6 captures respective time-synchronized sensor data at each timing interval within a clock cycle (e.g., from times $t_1$-$t_7$) of a local clock signal. For example, at time $t_1$, each of the sensors TS1-TS6 may capture respective sensor data in response to the first sensor pulse SP1; at time $t_2$, each of the sensors TS1-TS6 may capture respective sensor data in response to the second sensor pulse SP2; at time $t_3$, each of the sensors TS1-TS6 may capture respective sensor data in response to the third sensor pulse SP3; at time $t_4$, each of the sensors TS1-TS6 may capture respective sensor data in response to the fourth sensor pulse SP4; at time $t_5$, each of the sensors TS1-TS6 may capture respective sensor data in response to the fifth sensor pulse SP5; and, at time $t_6$, each of the sensors TS1-TS6 may capture respective sensor data in response to the sixth sensor pulse SP6.

On the other hand, each of the asynchronous sensors AS1-AS4 may capture respective asynchronous sensor data at different rates and/or times with respect to the time-synchronized sensors TS1-TS6 and other asynchronous sensors AS1-AS4. For example, sensor AS1 may capture sensor data at times $t_2$ and $t_5$; sensor AS2 may capture sensor data at times $t_1$, $t_4$, and $t_6$; sensor AS3 may capture sensor data at times $t_3$ and $t_4$; and sensor AS4 may capture sensor data at times $t_2$ and $t_6$. Since the sensor synchronization system 200 does not control the activation of individual asynchronous sensors AS1-AS4, the system 200 may not have a priori knowledge about the timing relationship between received asynchronous sensor data and/or time-synchronized sensor data.

Although the asynchronous sensors AS1-AS4 may not be triggered or activated by sensor pulses SP1-SP6, as shown in the example of FIG. 5, the asynchronous sensor data captured by each of the sensors AS1-AS4 nonetheless coincides with a respective sensor pulse. For example, the asynchronous sensor data captured at times $t_1$, $t_2$, $t_3$, $t_4$, $t_5$, and $t_6$ may be temporally aligned with sensor pulses SP1, SP2, SP3, SP4, SP5, and SP6, respectively. Thus, in example embodiments, the sensor data acquisition interface 240 may use the corresponding sensor pulses SP1-SP6 to determine the timing relationship between received asynchronous sensor data and/or time-synchronized sensor data. This may enable the asynchronous sensor data to be used for vehicle navigation and/or other vehicle operations. For example, any sensor data (e.g., from time-synchronized sensors TS1-TS6 and/or asynchronous sensors AS1-AS4) that coincides with the same sensor pulse may be combined to generate real-time 3D sensor images.

In some implementations, the sensor data acquisition interface 240 may format the incoming sensor data 202 (e.g., into clock-synchronized sensor data 204) for a particular communications platform implemented by the autonomous vehicle. For example, the interface 240 may include sub-modules for adding a timestamp 242, a header 244, a footer 246, a status bit (SB) 248, and/or other platform-specific information or parameters to the incoming sensor data 202. The added information may enable the incoming sensor data 202 to be recognized and/or processed by one or more processors or controllers of the autonomous vehicle. The timestamp 242 may indicate the time at which corresponding sensor data is captured or acquired in relation to the local clock signal 214. The header 244 and footer 246 may indicate the beginning and end, respectively, of the sensor data (e.g., which may be provided as a payload) received from a particular sensor at a given instance of time. The status bit 248 may be used to perform a parity check and/or verify the validity of the sensor data.

According to some examples, the clock-synchronized sensor data 204 can be structured into a message (or messages) which enable the underlying data (sensor values synchronized in time) to be storable and/or transportable. For example, the clock-synchronized sensor data 204 can be stored in memory so that aspects of a given trip can be reproduced at a later time. Alternatively, some clock-synchronized sensor data 204 can be transmitted to other vehicles or to a network service. The clock-synchronized sensor data 204 can be structured so that the sensor data 202 can be transferred (e.g., transmitted over a cellular network to a server) while precisely maintaining contextual information relating to the sensor data 202, including time stamp and identification of source of the sensor data 202.

Figure 6:
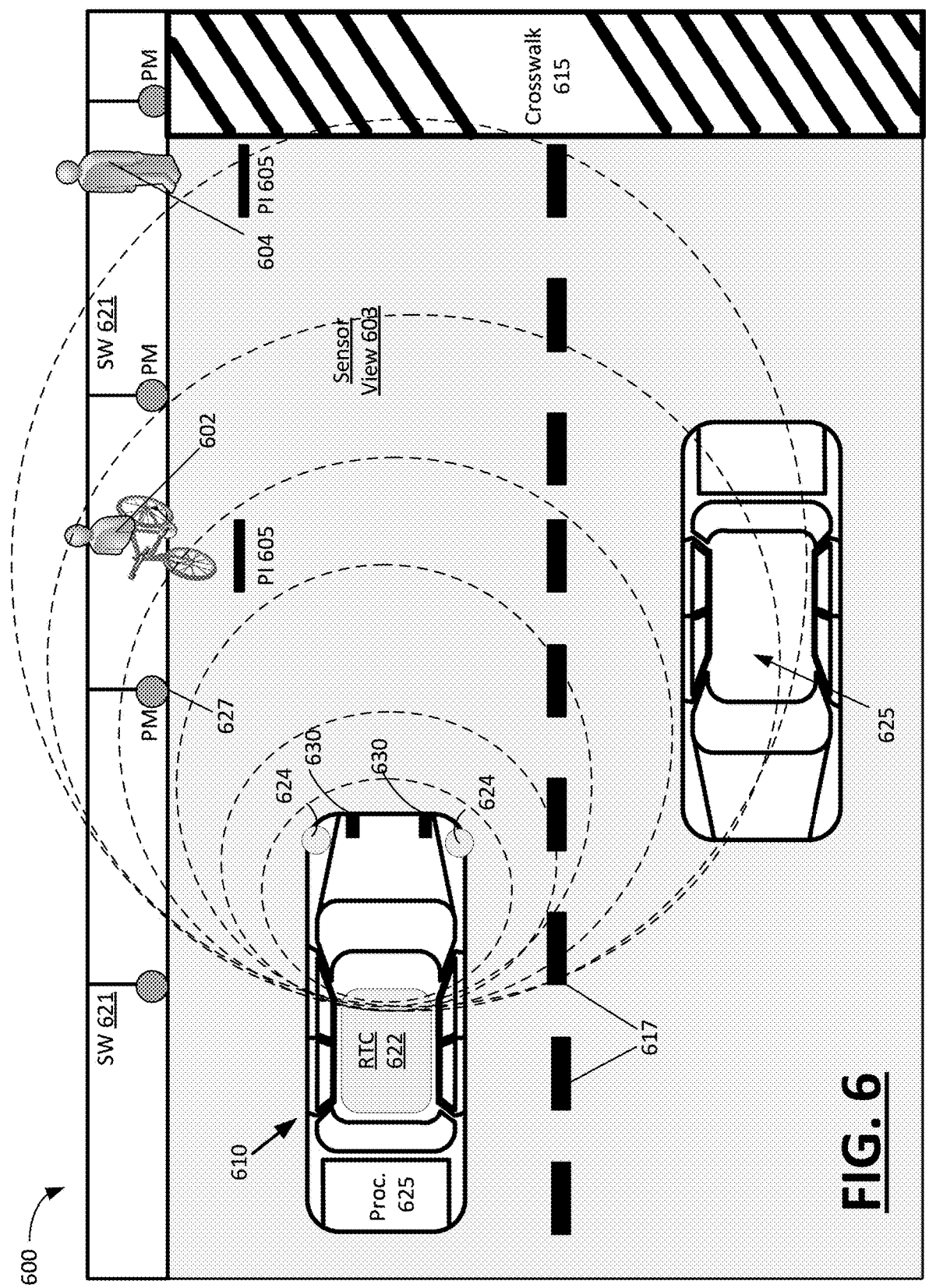
FIG. 6 shows an example of an autonomous vehicle that uses sensor data to navigate an environment in accordance with example implementations.

FIG. 6 shows an example of an autonomous vehicle 610 that uses sensor data to navigate an environment 600 in accordance with example implementations. In an example of FIG. 6, the autonomous vehicle 610 may include various sensors, such as a roof-top camera array (RTC) 622, front-facing cameras 624 and laser rangefinders 630. A processing center 625, comprising a combination of one or more processors and memory units can be positioned in a trunk of the vehicle 610.

According to an example, the vehicle 610 uses one or more sensor views 603 (e.g., a stereoscopic or 3D image of the environment 600) to scan a road segment on which the vehicle 610 is about to traverse. The vehicle 610 can process image data, corresponding to the sensor views 603 from one or more sensors in order to detect objects that are, or may potentially be, in the path of the vehicle 610. In an example shown, the detected objects include a bicyclist 602, a pedestrian 604, and another vehicle 625, each of which may potentially cross into a road segment 615 on which the vehicle 610 is about to traverse. The vehicle 610 can use information about the road segment and/or image data from the sensor views 603 to determine that the road segment includes a divider 617 and an opposite lane, as well as a sidewalk (SW) 621 and sidewalk structures such as parking meters (PM) 627.

The vehicle 610 may determine the location, size, and/or distance of objects in the environment 600 based on the sensor view 603. For example, the sensor views 603 may be 3D sensor images that combine sensor data from the roof-top camera array 622, front-facing cameras 624, and/or laser rangefinders 630. In some implementations, the vehicle 610 may implement the sensor synchronization system 200 of FIG. 2 to determine the relative timing of sensor data received from the various sensors (e.g., in relation to other sensor data and/or a local clock signal of the vehicle 610). This may allow the vehicle 610 to update the sensor views 603 in real-time as the vehicle 610 moves along its designed rate. Accordingly, the vehicle may accurately detect the presence of objects in the environment 600, allowing the vehicle to safely navigate the route while avoiding collisions with other objects.

According to examples, the vehicle 610 may determine a probability that one or more objects in the environment 600 will interfere or collide with the vehicle 610 along the vehicle's current path or route. In some aspects, the vehicle 610 may selectively perform an avoidance action based on the probability of collision. The avoidance actions may include velocity adjustments, lane aversion, roadway aversion (e.g., change lanes or driver far from curb), light or horn actions, and other actions. In some aspects, the avoidance action may run counter to certain driving conventions and/or rules (e.g., allowing the vehicle 610 to drive across center line to create space with bicyclist).

In an example, the sensor synchronization system 200 may enable the vehicle 610 to accurately determine that the parking meters 627 are fixed objects (e.g., based on their relatively static or stable locations in the sensor views 603). Thus, the vehicle 610 may navigate around the parking meters 627 at higher speeds, since the parking meters 627 are unlikely to cross into the path of the oncoming vehicle 610. In contrast, without accurate timing of sensor data, the vehicle 610 could potentially detect the parking meters 627 as moving objects, for example, based on optical distortions or artifacts in the sensor views 603 and/or inconsistent distance information from multiple sensors (e.g., when attempting to combine sensor data taken at different times). This could cause the vehicle 610 to unnecessarily slow down or drive more cautiously when approaching the parking meters 627.

In another example, the sensor synchronization system 200 may enable the vehicle 610 to accurately determine that the bicyclist 602 and pedestrian 604 are moving objects (e.g., based on changes to their locations in the sensor views 603). Thus, the vehicle 610 may slow down or drive more cautiously when approaching the bicyclist 602 and/or pedestrian 604. In contrast, without accurate timing of sensor data, the vehicle 610 could potentially detect the bicyclist 602 and/or pedestrian 604 as stationary objects, for example, based on optical distortions or artifacts in the sensor views 603 and/or inconsistent distance information from multiple sensors (e.g., when attempting to combine sensor data taken at different times). This could cause the vehicle 610 to drive at unsafe speeds when navigating around the bicyclist 602 and/or pedestrian 604.

Methodology

Figure 7:
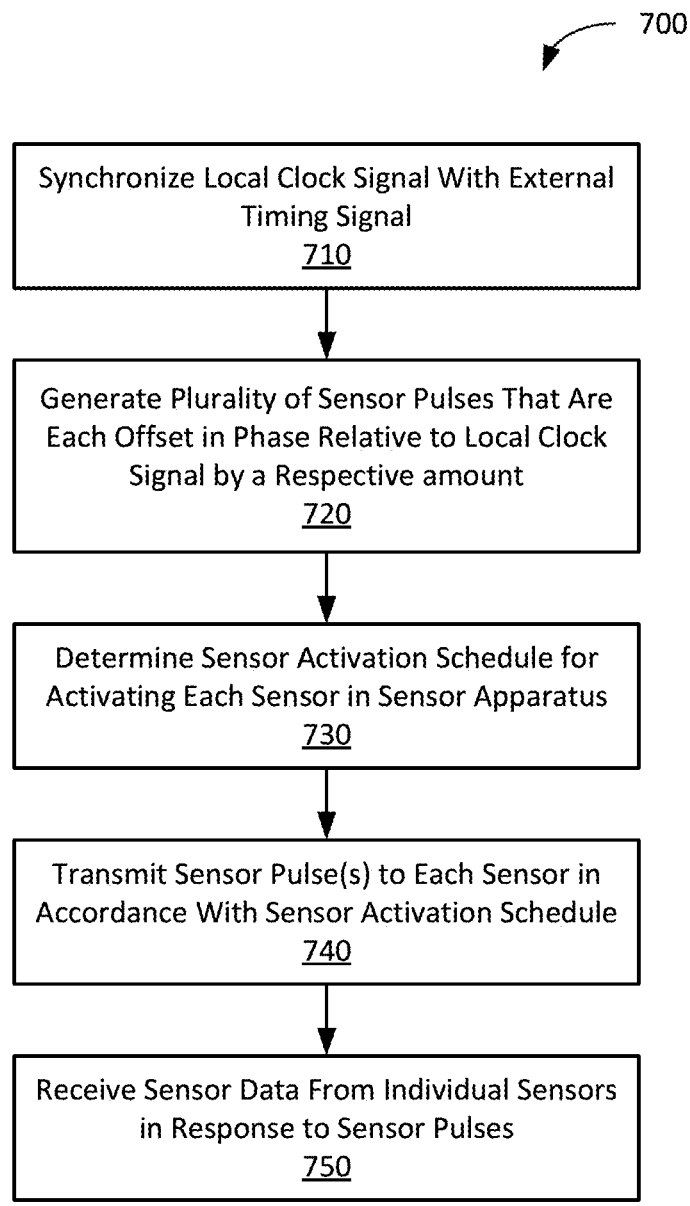
FIG. 7 shows a flowchart of an example operation for triggering time-synchronized capture of sensor data.

FIG. 7 shows a flowchart of an example operation 700 for triggering time-synchronized capture of sensor data. The operation 700 can be implemented, for example, by the sensor synchronization system 200 of FIG. 2. Accordingly, references made to the elements of FIG. 2 are for purposes of illustrating a suitable element or component for performing a step or sub-step being described.

The sensor synchronization system 200 first synchronizes a local clock signal with an external timing signal (710). For example, the local clock signal 214 may be used as a reference signal, for timing purposes, by other elements and/or components of an autonomous vehicle. In example implementations, the system 200 may receive a PPS signal 201 from a GPS receiver (not shown). As described above, the PPS signal 201 may be a highly accurate and reliable external timing signal derived from satellite signals. In some aspects, the local CLK synchronization circuitry 212 may align the phase of a local clock signal 214 with the PPS signal 201. For example, the CLK synchronization circuitry 212 may include a PLL that generates the local clock signal 214 based at least in part on the PPS signal 201.

The system 200 may generate a plurality of sensor pulses that are each offset in phase relative to the local clock signal by a respective amount (720). In example implementations, the sensor pulse generator 220 may generate the sensor pulses by dividing a clock cycle of the local clock signal 214 into a number (N) of timing intervals, and generate a corresponding number (N) of sensor pulses such that each sensor pulse coincides (e.g., is aligned) with a respective timing interval (e.g., as described above with respect to FIG. 3). In some aspects, the number (N) of sensor pulses generated per clock cycle of the local clock signal 214 may depend on a desired granularity of timing. For example, a higher granularity (e.g., corresponding to more sensor pulses) may yield more precise timing information.

In some aspects, the system 200 may determine a sensor activation schedule for activating each sensor of a given sensor apparatus (730). For example, the sensor activation schedule 205 may describe or otherwise indicate respective activation times for each of a plurality of sensors. More specifically, each sensor activation time may correspond with a capturing of sensor data by a respective sensor of the sensor apparatus. As described above with respect to the example sensor activation schedules shown in Tables 1-3, each sensor activation time may coincide with one of the plurality of sensor pulses (e.g., within a given clock cycle of the local clock signal 214). In some aspects, the sensor activation schedule 205 may be determined based, at least in part, on one or more operating parameters of the autonomous vehicle (e.g., vehicle speed, desired sensor framerate or resolution, etc.)

The system 200 may then transmit one or more sensor pulses to each sensor of the sensor apparatus in accordance with the sensor activation schedule (740). In example implementations, the pulse distribution logic 230 may package or distribute the sensor pulses, in accordance with sensor activation schedule 205, as triggers 232 for activating each of the plurality of sensors. For example, each trigger 232 may contain one or more sensor pulses intended for a particular sensor. More specifically, each sensor pulse included with a trigger 232 may cause the receiving sensor to capture respective sensor data at one of a plurality of predetermined timing intervals (e.g., in relation to the local clock signal 214). In some aspects, the pulse distribution logic 230 may repeat or reuse the same sensor activation schedule 205 for subsequent clock cycles of the local clock signal 214. In other aspects, the pulse distribution logic 230 may modify the existing sensor activation schedule 205 or select a new sensor activation schedule to be used in subsequent clock cycles.

Finally, the system 200 may receive sensor data from individual sensors in response to the sensor pulses (750). As described above with respect to FIGS. 4A-4C, each of the plurality of sensors (e.g., camera modules C1-C6) may capture respective sensor data, at predetermined time intervals (e.g., at times $t_1$, $t_2$, $t_3$, $t_4$, $t_5$, or $t_6$), in response to at least one of the plurality of sensor pulses (e.g., sensor pulses SP1-SP6). In example implementations, the sensor data acquisition interface 240 may process incoming sensor data 202 received from one or more sensor apparatuses. In some aspects, the sensor data acquisition interface 240 may convert the incoming sensor data 202 into clock-synchronized sensor data 204, for example, by determining a timing of the incoming sensor data 202 in relation to the local clock signal 214.

Figure 8:
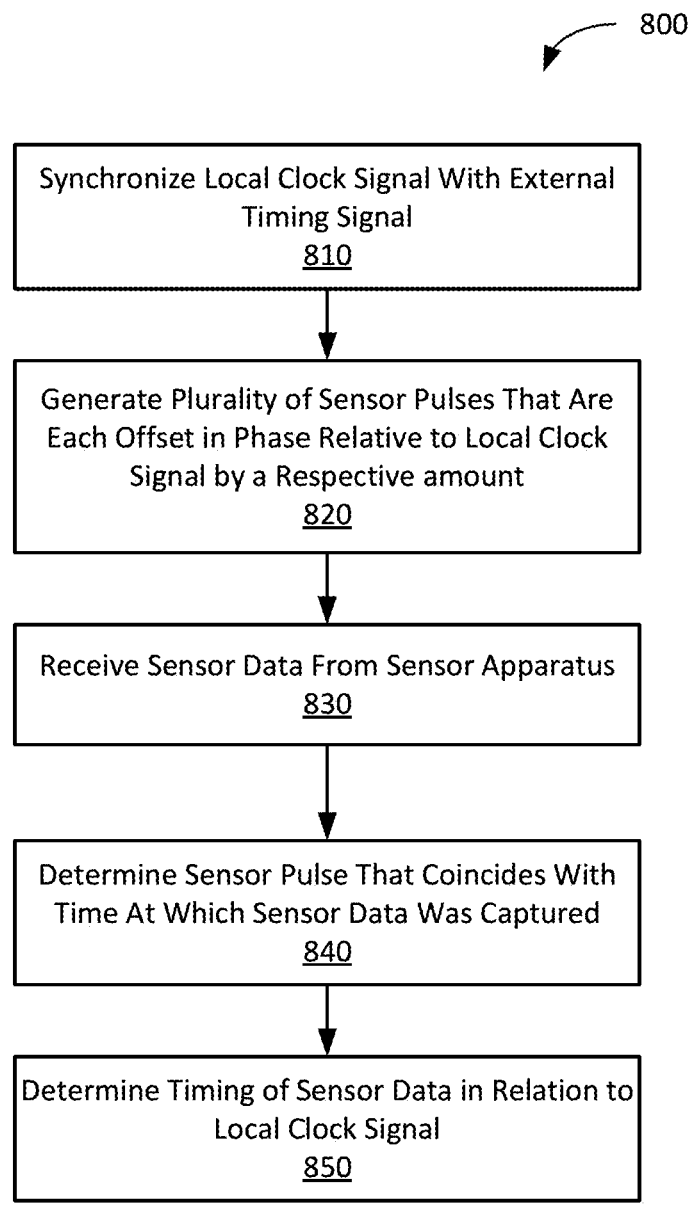
FIG. 8 shows a flowchart of an example operation for determining a timing of asynchronous sensor data in relation to a local clock signal.

FIG. 8 shows a flowchart of an example operation 800 for determining a timing of asynchronous sensor data in relation to a local clock signal. The operation 800 can be implement, for example, by the sensor synchronization system 200 of FIG. 2. Accordingly, references made to the elements of FIG. 2 are for purposes of illustrating a suitable element or component for performing a step or sub-step being described.

The sensor synchronization system 200 may first synchronize a local clock signal with an external timing signal (810). For example, the local clock signal 214 may be used as a reference signal, for timing purposes, by other elements and/or components of an autonomous vehicle. In example implementations, the system 200 may receive a PPS signal 201 from a GPS receiver (not shown). As described above, the PPS signal 201 may be a highly accurate and reliable external timing signal derived from satellite signals. In some aspects, the local CLK synchronization circuitry 212 may align the phase of a local clock signal 214 with the PPS signal 201. For example, the CLK synchronization circuitry 212 may include a PLL that generates the local clock signal 214 based at least in part on the PPS signal 201.

The system 200 may generate a plurality of sensor pulses that are each offset in phase relative to the local clock signal by a respective amount (820). In example implementations, the sensor pulse generator 220 may generate the sensor pulses by dividing a clock cycle of the local clock signal 214 into a number (N) of timing intervals, and generate a corresponding number (N) of sensor pulses such that each sensor pulse coincides (e.g., is aligned) with a respective timing interval (e.g., as described above with respect to FIG. 3). In some aspects, the number (N) of sensor pulses generated per clock cycle of the local clock signal 214 may depend on a desired granularity of timing. For example, a higher granularity (e.g., corresponding to more sensor pulses) may yield more precise timing information.

The system 200 may then receive sensor data from one or more sensor apparatuses (830), and determine one or more sensor pulses that coincide with times at which the sensor data was captured (840). For example, the received sensor data may include asynchronous sensor data that may not be captured in response to triggers 232 from the sensor synchronization system 200. In example implementations, the sensor data acquisition interface 240 may compare the incoming sensor data with the plurality of sensor pulses to determine which of the sensor pulses most closely coincides with the time at which the sensor data was captured or acquired (e.g., received by the sensor data acquisition interface 240). As described above with respect to FIG. 5, the sensor data acquisition interface 240 may use the corresponding sensor pulses (e.g., sensor pulses SP1-SP6) determine the timing relationship between received asynchronous sensor data (e.g., from asynchronous sensors AS1-AS4).

Finally, the system 200 may determine a timing of the received sensor data in relation to the local clock signal (850). Since each of the sensor pulses is offset in phase relative to the local clock signal 214 by a predetermined (e.g., known) amount, the sensor data acquisition interface 240 may quickly determine the relative timing of any incoming asynchronous sensor data (e.g., in relation to the local clock signal 214) based on the sensor pulse that coincides with the received sensor data. An autonomous vehicle's system controller (e.g., sensor mapping logic 122) may then use the timing information, for example, to construct an accurate 3D sensor image of the vehicle's environment (e.g., by combining multiple sensor data that is captured and/or acquired at substantially the same time).

Figure 9:
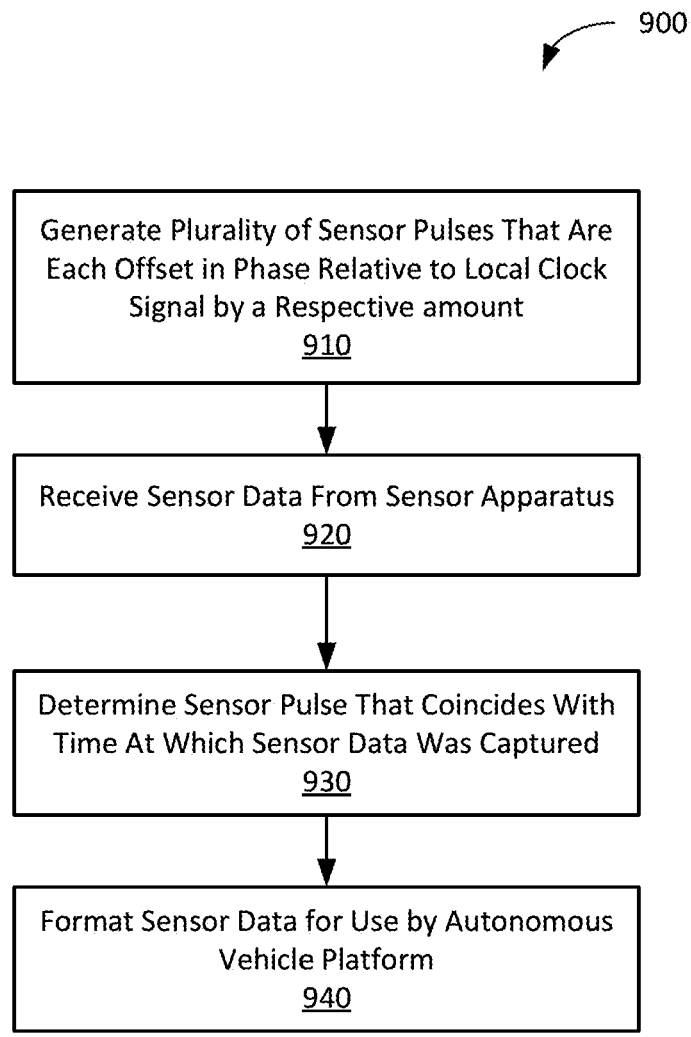
FIG. 9 shows a flowchart of an example operation for formatting sensor data for use by an autonomous vehicle platform.

FIG. 9 shows a flowchart of an example operation 900 for formatting sensor data for use by an autonomous vehicle platform. The operation 900 can be implemented, for example, by the sensor synchronization system 200 of FIG. 2. Accordingly, references made to the elements of FIG. 2 are for purposes of illustrating a suitable element or component for performing a step or sub-step being described.

The sensor synchronization system 200 may first generate a plurality of sensor pulses that are each offset in phase relative to the local clock signal by a respective amount (910). In example implementations, the sensor pulse generator 220 may generate the sensor pulses by dividing a clock cycle of the local clock signal 214 into a number (N) of timing intervals, and generate a corresponding number (N) of sensor pulses such that each sensor pulse coincides (e.g., is aligned) with a respective timing interval (e.g., as described above with respect to FIG. 3). In some aspects, the number (N) of sensor pulses generated per clock cycle of the local clock signal 214 may depend on a desired granularity of timing. For example, a higher granularity (e.g., corresponding to more sensor pulses) may yield more precise timing information.

The system 200 may then receive sensor data from one or more sensor apparatuses (920), and determine one or more sensor pulses that coincide with times at which the sensor data was captured (930). For example, the received sensor data may include asynchronous sensor data that may not be captured in response to triggers 232 from the sensor synchronization system 200. In example implementations, the sensor data acquisition interface 240 may compare the incoming sensor data with the plurality of sensor pulses to determine which of the sensor pulses most closely coincides with the time at which the sensor data was captured or acquired (e.g., received by the sensor data acquisition interface 240). As described above with respect to FIG. 5, the sensor data acquisition interface 240 may use the corresponding sensor pulses (e.g., sensor pulses SP1-SP6) determine the timing relationship between received asynchronous sensor data (e.g., from asynchronous sensors AS1-AS4).

Finally, the system 200 may format the received sensor data for use by an autonomous vehicle platform (940). In example implementations, the sensor data acquisition interface 240 may format incoming sensor data 202 into clock-synchronized sensor data 204. The clock-synchronized sensor data 204 may be in a format that can be recognized and/or processed by one or more processors or controllers of the autonomous vehicle. In some aspects, the sensor data acquisition interface 240 may include sub-modules for adding a timestamp 242, a header 244, a footer 246, a status bit (SB) 248, and/or other platform-specific information or parameters to the incoming sensor data 202. For example, the timestamp 242 may indicate the time at which corresponding sensor data is captured or acquired in relation to the local clock signal 214. The header 244 and footer 246 may indicate the beginning and end, respectively, of the sensor data (e.g., which may be provided as a payload) received from a particular sensor at a given instance of time. The status bit 248 may be used to perform a parity check and/or verify the validity of the sensor data.

Figure 10:
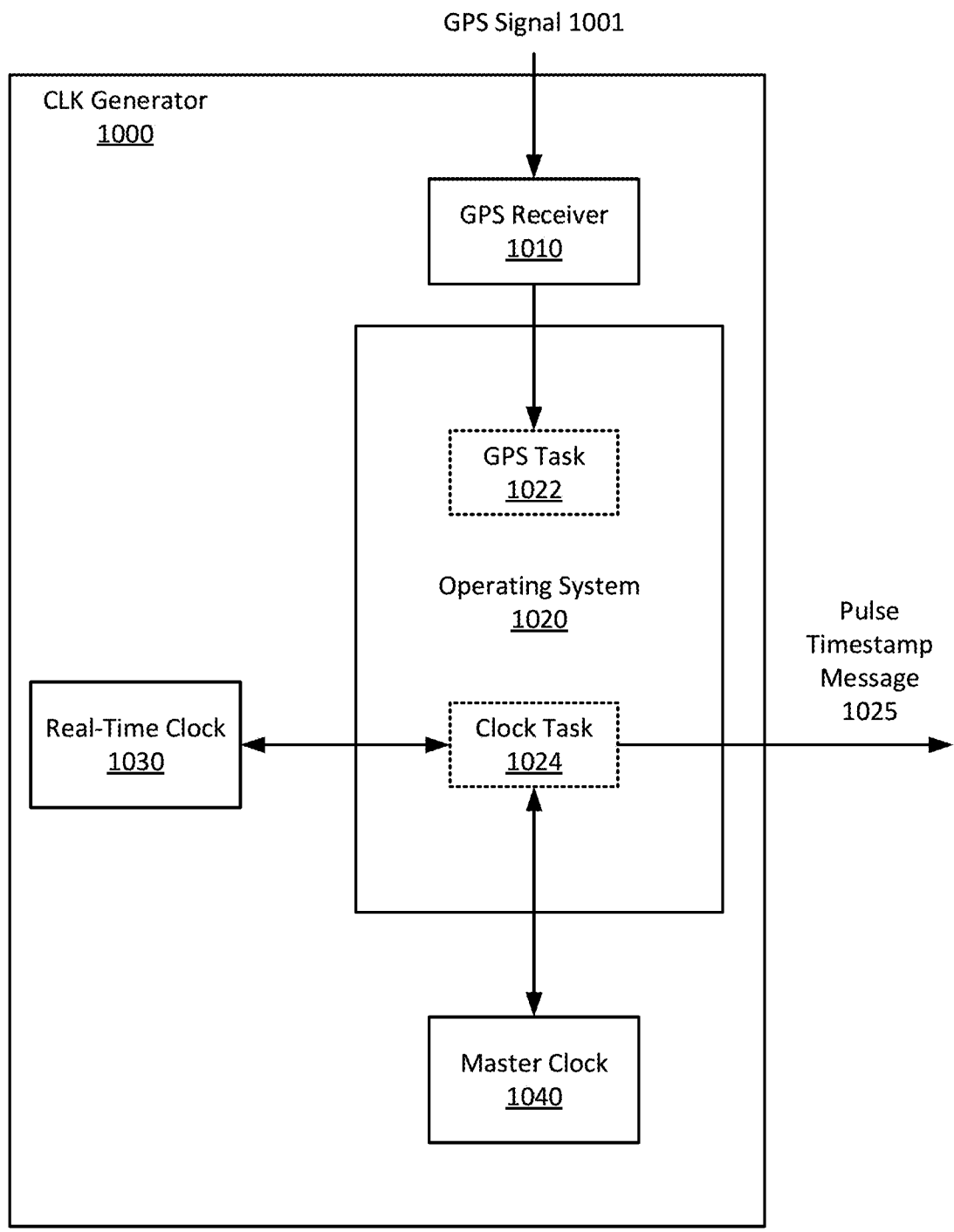
FIG. 10 shows a block diagram of a clock generator for generating pulse timestamp messages to be used by other elements of a control system.

FIG. 10 shows a block diagram of a clock generator for generating pulse timestamp messages to be used by other elements of a control system. The clock generator 1000 includes a GPS receiver 1010, an operating system 1020, a real-time clock 1030, and a master clock 1040.

In some examples, the master clock 1040 is a local high-precision time reference on the microcontroller and the source for synchronized time for the sensor apparatuses of the autonomous vehicle. The real-time clock (RTC) 1030 is a local low-precision time reference, based on a supercap-backed-up low-power oscillator running on the microcontroller, which continues to maintain time even when the microcontroller itself is powered down. Although both of these clocks are local to the clock generator 1000 microcontroller, they operate from two separate crystal oscillators, and thus their times may drift and develop offsets from one another.

A GPS task 1022 is responsible for initializing a global GPS time module object in the operating system 1020 and for ongoing serial communication with the GPS receiver 1010. This includes establishing communications with the GPS receiver 1010, configuring the GPS receiver 1010, and parsing the data coming from the GPS receiver 1010 into data structures accessible by other components of the system. In some examples, the data coming from the GPS receiver 1010 takes the form of National Marine Electronics Association (NMEA) messages. These NMEA messages contain information such as geographical coordinates, time, and date.

When the GPS receiver 1010 is powered on and receiving data from a threshold number of GPS satellites, it generates a synchronized pulse per second (PPS) output signal which the operating system 1020 can use for time synchronization purposes. In some examples, the initial time is set through the reception of an NMEA packet containing the year, month, day, hours, minutes, and seconds values of the current time in Coordinated Universal Time (UTC). This time is converted into the number of seconds since the beginning of the Unix epoch on Jan. 1, 1970.

In some aspects, each time the GPS receiver 1010 generates a PPS signal, a high priority interrupt is generated on the node. An operating system 1020 interrupt service routine associated with this interrupt can record a system timestamp associated with the pulse and, using one of the spare system timers, schedule an interrupt to be generated in the next second. This scheduled interrupt can be used for synchronization purposes with other devices, as previously described in FIGS. 1-9.

The clock task 1024 initializes the master clock 1040 hardware with good data and publishes the time from the master clock 1040 to the rest of the system when the hardware provides valid timestamps. The primary use of the clock task 1024 is to provide pulse timestamp messages 1025 to the system. It is also a first-level filter that determines the best time available and propagates that to the master clock 1040. In some aspects, the clock task 1024:

1. Reads timesync User Datagram Protocol (UDP) packets generated by the master clock 1040;
2. Determines whether or not the time provided by the master clock 1040 is valid;
3. If the time from the master clock 1040 hardware is not valid, then the clock task 1024 determines the best value of time available and sets the master clock 1040; and
4. Generates a pulse timestamp message 1025 when valid time data is received.

In some examples, the clock task 1024 wakes up once per second and reads the times from the RTC 1030 and the master clock 1040 and converts the times into the system time format described above. The clock task 1024 then updates the RTC 1030 based on the skew and offset between it and the master clock 1040.

The master clock 1040 can operate in one of two modes: freerunning mode and GPS mode. The mode affects how the clock task 1024 interprets the validity of the timestamp from the master clock 1040, as well as the manner in which it synchronizes time with the master clock 1040.

In some aspects, the PPS signal and PPS timestamp packets are generated by a hardware time source. Rather than propagating these packets to each individual node, they are consumed by one node, which is designated as the time_sync master processing node. This node runs the clock task 1024 (i.e., the master clock task) that converts the PPS signal and timestamp into a pulse timestamp message 1025, which is sent out over a pulse timestamp channel. These pulse timestamp messages 1025 can then be consumed by a time model task on each node. The device/sensor-specific tasks running on the nodes can then propagate these timestamps to other embedded boards using whatever message formats are appropriate.

The master clock 1040 has two modes of operation that determine the hardware time source used: freerunning mode and GPS mode. In some examples, the mode is selected or determined at initialization. In freerunning mode, the time is initially sourced from the RTC 1030. The master clock 1040 also publishes the amount of uncertainty it has in the time to allow the system to determine whether or not its current time is usable.

In GPS mode, the system acquires a GPS signal 1001 and uses the absolute GPS time to set the master clock 1040 and RTC 1030. Once the lock is acquired, the master clock 1040 stays synchronized with the time from GPS (or any similar satellite constellation system). If the GPS signal 1001 is lost, the master clock 1040 continues to account for clock skew and estimate the GPS time moving forward. The master clock 1040 keeps track of and publishes any error and uncertainty in the time, and also continues to publish time until the uncertainty reaches a predetermined threshold.

In one aspect, the clock generator 1000 board is responsible for generating its own PPS output, locked to the master clock 1040, by using the same master timer used to maintain the master clock 1040 to generate the PPS output. By running the hardware in edge-aligned Pulse Width Modulation (PWM) mode, the clock generator 1000 can arrange a pulse of arbitrary duty cycle to coincide with the seconds value rolling over on the master clock 1040.

Figure 11:
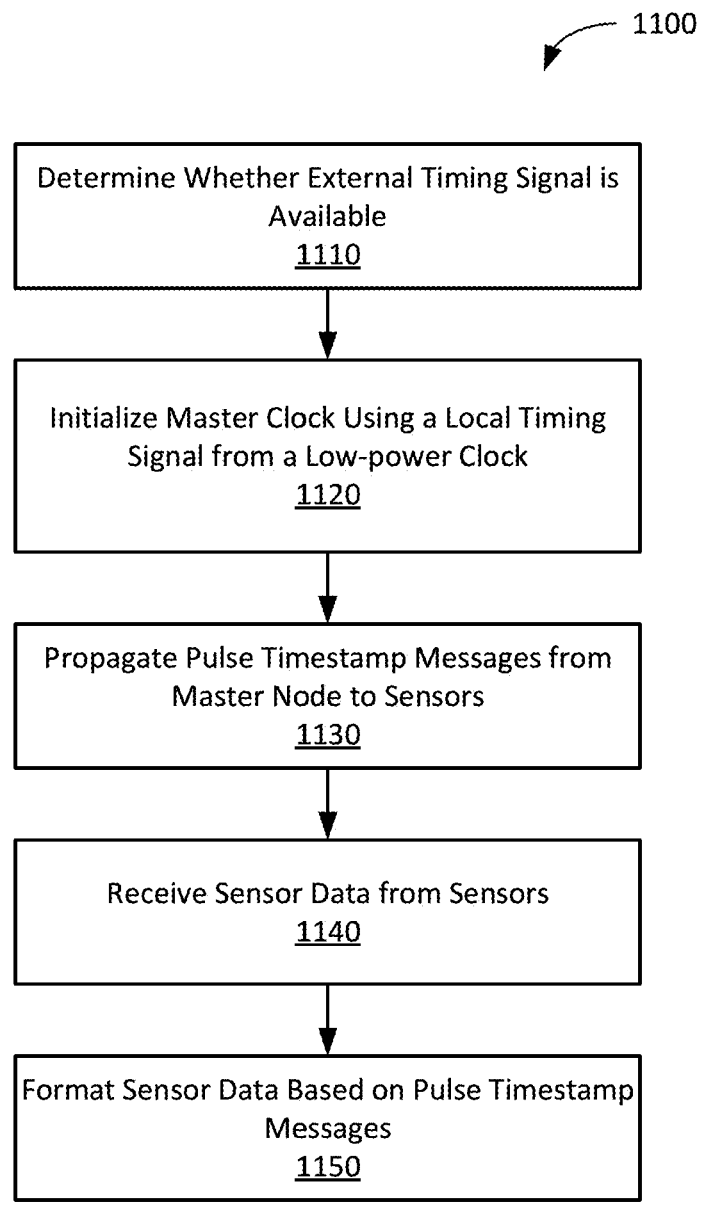
FIG. 11 shows a flowchart of an example operation for managing timing sources for time-synchronized capture of sensor data.

FIG. 11 shows a flowchart of an example operation for managing timing sources for time-synchronized capture of sensor data. Upon initializing a master clock on a master processing node for a sensor apparatus of the autonomous vehicle, the system determines whether an external timing signal (e.g., a GPS signal) is available (1110). If the signal is not available, the system sets the master clock using a local timing signal from a low-power clock on the autonomous vehicle (1120). Based on a clock cycle of the master clock, the system propagates timestamp messages to the sensors of the sensor apparatus (1130), receives sensor data from the sensors (1140), and formats the sensor data based on the timestamp messages (1150).

Figure 12:
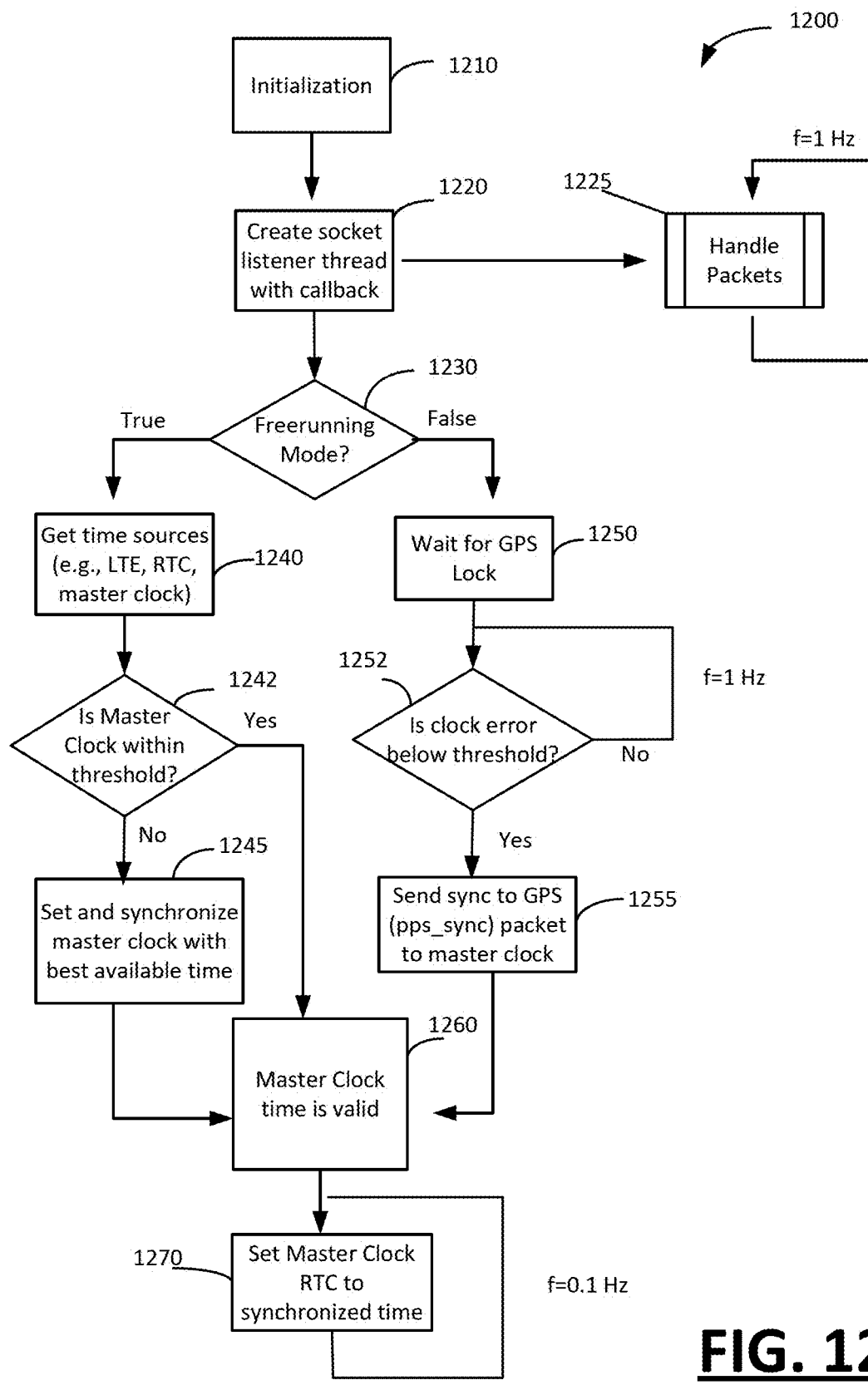
FIG. 12 shows a flowchart of an example operation for master clock task time synchronization.

FIG. 12 shows a flowchart of an example operation for master clock task time synchronization. The master clock task handles timestamp packets and propagates them to the rest of the system. The master clock task also handles the initialization of the master clock by validating and setting the RTC, or commanding it to sync with the GPS time. Once the system is initialized, timestamps monotonically increase with no discontinuity between nodes unless a command is received for the hardware to sync with the GPS again.

In some aspects, the clock task is first initialized (1210). Upon being initialized, the clock task listens for timesync packets on a specific port using a UDP socket over Ethernet (1220). A callback is registered to parse these packets, determine whether or not the time advertised is valid, and then publish the packets to other nodes in the system (1225). The task configuration determines whether the clock is running in freerunning or GPS mode, which in turn determines the time validation mechanism (1230).

In freerunning mode, the time is initially sourced from the low-power real-time clock. The master clock also publishes the amount of uncertainty it has in the time to allow the system to determine whether or not its current time is usable (1240).

In freerunning mode, a time is valid when it is within a threshold margin of the most reliable source of time and is also advertised as valid by the master clock hardware (1242). If not valid, the clock task sets and synchronizes the master clock with the best available time, such as the time from the RTC (1245). However, the master clock hardware only uses the RTC as an initial value.

In GPS Mode, the clock task waits for a GPS lock and then validates the time from GPS (1250). The time is valid when it is synchronized with the GPS time as advertised by the satellites, synchronized with the GPS PPS signal, within some margin, and stays synchronized with GPS time, even when the signal is lost, within some predetermined threshold (1252). Assuming that the error is below the predetermined threshold even when the GPS signal is lost, the clock task sends a sync packet to the master clock hardware (1255). If the time is not valid, the clock task will find the best value of time available and seed the master clock with it.

In either mode, the master clock time is set once (at task start) for the duration of the run (1260). The task will periodically set the RTC to the current synchronized system time (1270). This value is not propagated until a system restart, however, allowing the master clock to compensate for RTC clock drift while leaving the published monotonic time unaffected. The clock task reads the RTC time at power on, sets the master clock, and then maintains its own model of time from that point on. In some examples, the clock task may reset the master clock hardware to propagate this time, but only prior to initial time synchronization.

Figure 13:
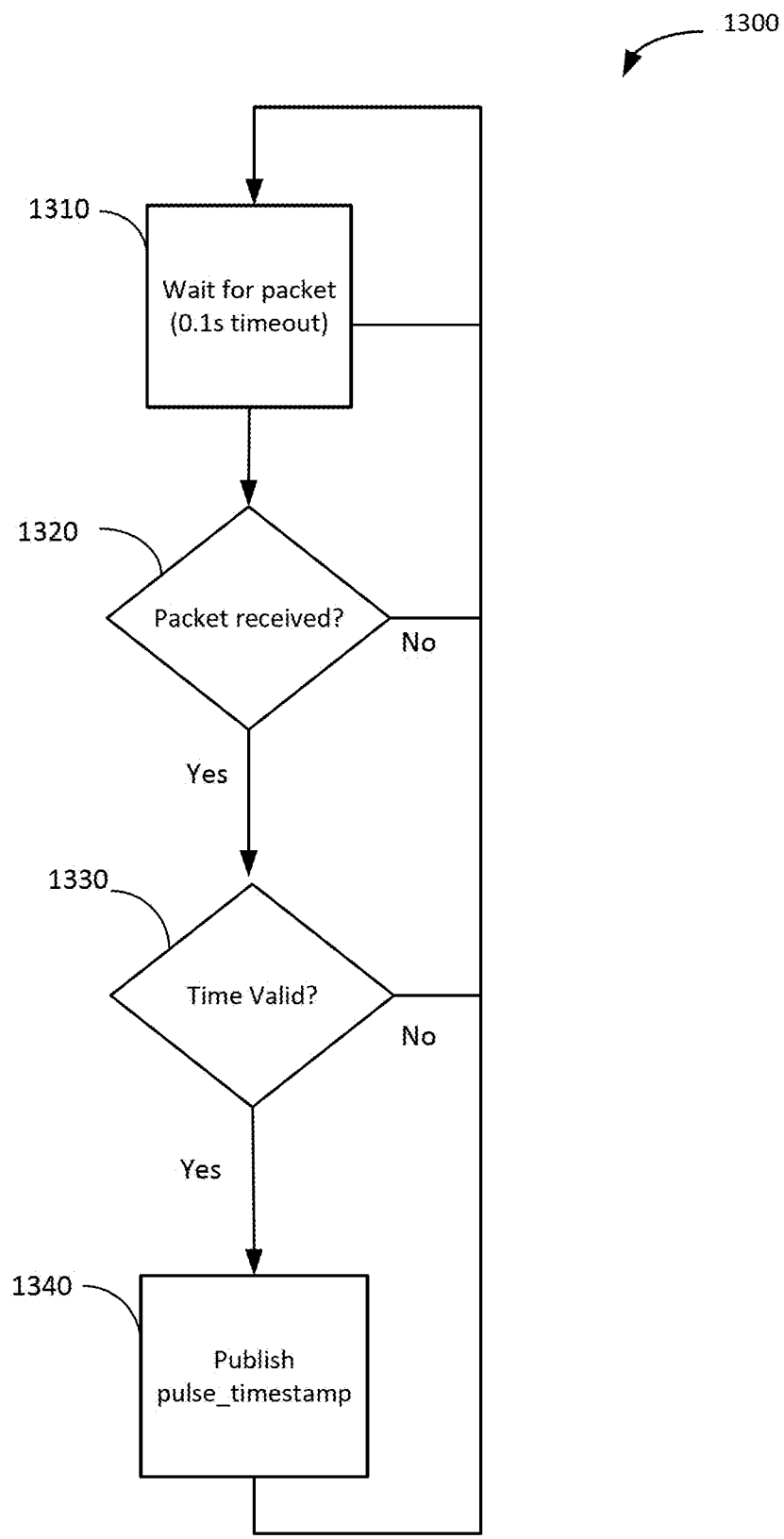
FIG. 13 shows a flowchart of an example operation for handling packets from a master clock.

FIG. 13 shows a flowchart of an example operation for handling packets from the master clock. The packet handler operates similarly regardless of whether the system is in GPS mode or freerunning mode. The packet handler listens for timestamp packets from the master clock (1310) In some examples, the packets which occur at a rate of 1 Hz, or once per second. When a packet is received, the master node parses the packet to determine whether it is valid (1320).

In freerunning mode, a time is valid when it is within a threshold margin of the most reliable source of time and is also advertised as valid by the master clock hardware (1330).

In GPS Mode, a time is valid when it is synchronized with the GPS time as advertised by the satellites, synchronized with the GPS PPS signal, within some margin, and stays synchronized with GPS time, even when signal is lost, within some predetermined threshold.

If the time is valid, the master node generates a pulse timestamp message and publishes the message to the other nodes in the system (1340).

Hardware Diagrams

Figure 14:
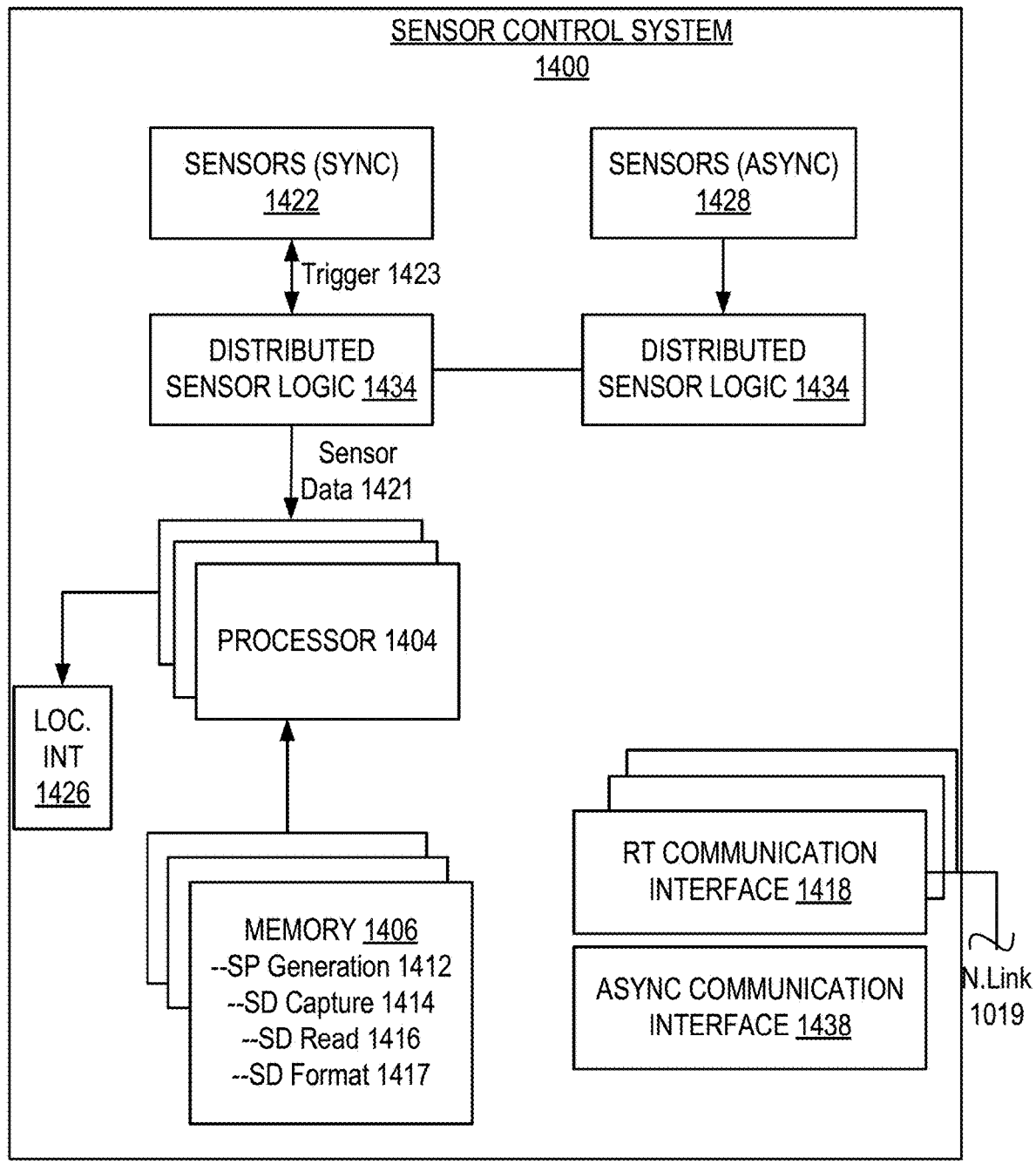
FIG. 14 shows a block diagram of a sensor control system that may be implemented on an autonomous vehicle, in accordance with example embodiments.

FIG. 14 shows a block diagram of a sensor control system 1400 that may be implemented on an autonomous vehicle, in accordance with example embodiments. The sensor control system 1400 can be implemented using one or more processors 1404, memory resources 1406, a number of time-synchronized sensors 1422, and a number of asynchronous sensors 1428. In the context of FIGS. 1 and 2, control system 140 and/or sensor synchronization system 200 can be implemented using one or more components of the sensor control system 1400.

According to some examples, the sensor control system 1400 may be implemented within an autonomous vehicle with software and hardware resources such as described with examples of FIGS. 1-13. In an example shown, the sensor control system 1400 can be distributed spatially into various regions of a vehicle. For example, the processors 1404 and/or memory resources 1406 can be provided in the trunk of a vehicle. The various processing resources of the sensor control system 1400 can also include distributed sensor logic 1434, which can be implemented using microprocessors or integrated circuits. In some examples, the distributed sensor logic 1434 can be implemented using field-programmable gate arrays (FPGA).

In an example of FIG. 14, the sensor control system 1400 can include a local communication interface 1426 (or series of local links) to vehicle interfaces and other resources of an autonomous vehicle. In one implementation, the local communication interface 1426 provides a data bus or other local link to electro-mechanical interfaces of the vehicle, such as used to operate steering, acceleration and braking, as well as to data resources of the vehicle (e.g., vehicle processor, OBD memory, etc.). The sensor control system 1400 may further include multiple communication interfaces, such as real-time communication interface 1418 and asynchronous communication interface 1438. The various communication interfaces 1418 and 1438 can send and receive communications to other vehicles, central services, human assistance operators, or other remote entities for a variety of purposes.

One or more of the communication interfaces 1418 and/or 1438 can enable the autonomous vehicle to communicate with one or more networks (e.g., cellular network) through use of a network link 1419, which can be wireless or wired. The sensor control system 1400 can establish and use multiple network links 1419 at the same time. Using the network link 1419, the sensor control system 1400 can communicate with one or more remote entities, such as network services or human operators. In one implementation, the real-time communication interface 1418 can be optimized to communicate information instantly, in real-time to remote entities (e.g., human assistance operators). In contrast, the asynchronous communication interface 1438 may communicate information at predetermined intervals and/or according to a schedule (e.g., vehicle status updates, software updates, etc.).

The memory resources 1406 can include, for example, main memory, a read-only memory (ROM), storage device, and cache resources. The main memory of memory resources 1406 can include random access memory (RAM) or other dynamic storage device, for storing information and instructions which are executable by the processors 1404. The processors 1404 can execute instructions for processing information stored with the main memory of the memory resources 1406. The main memory can also store temporary variables or other intermediate information which can be used during execution of instructions by one or more of the processors 1404. The memory resources 1406 can also include ROM or other static storage device for storing static information and instructions for one or more of the processors 1404. The memory resources 1406 can also include other forms of memory devices and components, such as a magnetic disk or optical disk, for purpose of storing information and instructions for use by one or more of the processors 1404.

According to some examples, the memory 1406 may store a plurality of software instructions including, for example, sensor pulse (SP) generation software 1412, sensor data (SD) capture software 1414, sensor data read software 1416, and sensor data format software 1417. During runtime (e.g., when the vehicle is operational), the software instructions 1412-1017 may be executed by one or more of the processors 1404 and/or distributed sensor logic 1434 in order to implement functionality such as described with respect to the autonomous vehicle control system 140 of FIG. 1 and/or the sensor synchronization system 200 of FIG. 2.

For example, in operating an autonomous vehicle, the distributed sensor logic 1434, in combination with one or more of the processors 1404, may execute the sensor pulse generation software 1412 to generate a plurality of sensor pulses that are each offset in phase relative to a local clock signal by a respective amount (e.g., as described above with respect to FIG. 3). Further, the distributed sensor logic 1434, in combination with the one or more processors 1404, may execute the sensor data capture software 1414 to activate a plurality of sensors of the sensor apparatus based at least in part on the plurality of sensor pulses. For example, in executing the sensor data capture software 1414, the distributed sensor logic 1434 may transmit triggers 1423 to the time-synchronized sensors 1422 to capture sensor data 1421 at predetermined times, in accordance with a sensor activation schedule (e.g., as described above with respect to FIGS. 4A-4C).

In some aspects, the distributed sensor logic 1434, in combination with one or more of the processors 1404, may execute the sensor data read software 1416 to determine timing information of received sensor data. For example, in executing the sensor data read software 1416, the distributed sensor logic 1434 may determine a timing of the sensor data 1421 received from one or more of the asynchronous sensors 1428 in relation to the local clock signal. In example implementations, the relative timing of the received sensor data 1421 may be determined, at least in part, by comparing the sensor data 1421 with the plurality of sensor pulses and selecting one of the sensor pulses that coincides with the sensor data 1421 received from each of the plurality of sensors (e.g., as described above with respect to FIG. 5).

Still further, in some aspects, the distributed sensor logic 1434, in combination with one or more of the processors 1404, may execute the sensor data format software 1417 to convert incoming sensor data to a format suitable for a communications platform of the autonomous vehicle. For example, in executing the sensor data format software 1417, the distributed sensor logic 1434 may add at least one of a header, footer, timestamp, or status bits to the received sensor data 1421. The timestamp may indicate the time at which corresponding sensor data is captured or acquired in relation to the local clock signal. The header and footer may indicate the beginning and end, respectively, of the sensor data received from a particular sensor at a given instance of time. The status bit may be used to perform a parity check and/or verify the validity of the sensor data.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A method of operating a sensor apparatus of an autonomous vehicle, the method comprising:
   upon initializing a master clock on a master processing node for the sensor apparatus, determining whether an external timing signal is available;
   upon determining that the external timing signal is available, synchronizing the master clock with the external timing signal;
   based on a clock cycle of the master clock, propagating a plurality of pulse timestamp messages from the master processing node to a plurality of sensors of the sensor apparatus;
   receiving sensor data from the plurality of sensors; and
   generating, based at least in part on the sensor data and at least in part on the plurality of pulse timestamp messages, output data to enable processing for controlling the autonomous vehicle.

2. The method of claim 1, further comprising:
   upon determining that the external timing signal is available, determining that the master clock remains synchronized, within a predetermined threshold, with the external timing signal.

3. The method of claim 2, wherein determining that the master clock remains synchronized with the external timing signal includes determining that a master clock time skew remains beneath the predetermined threshold even after the external timing signal is lost.

4. The method of claim 1, further comprising:
   dividing the clock cycle of the master clock into a plurality of timing intervals; and
   generating a plurality of sensor pulses, in relation to the plurality of pulse timestamp messages, based at least in part on one or more framerates or resolutions of each of the plurality of sensors of the sensor apparatus, wherein each of the plurality of sensor pulses are aligned with a respective one of the plurality of timing intervals.

5. The method of claim 4, wherein the number of the plurality of timing intervals into which the clock cycle of the master clock is divided is based at least in part on a framerate or resolution of a second sensor apparatus.

6. The method of claim 4, wherein the sensor data is captured by the plurality of sensors in accordance with a sensor activation schedule based on the plurality of sensor pulses.

7. The method of claim 1, further comprising:
   continuously updating a skew and offset on a low-power clock based on the clock cycle of the master clock.

8. The method of claim 7, wherein the master clock and the low-power clock are located on a microcontroller.

9. The method of claim 8, wherein the low-power clock maintains time even when the microcontroller is powered down.

10. The method of claim 1, further comprising:
    generating a three-dimensional sensor image for autonomous vehicle navigation based at least in part on the sensor data.

11. A sensor synchronization system for an autonomous vehicle, comprising:
    a master processing node for a sensor apparatus of the autonomous vehicle, the master processing node comprising:
      circuitry for a master clock; and
      circuitry for a low-power clock that maintains time even when a microcontroller for the master processing node is powered down;
    a memory that stores instructions for operating the sensor apparatus; and
    one or more processors that, upon executing the instructions, cause the sensor synchronization system to:
      upon initializing the master clock, determining whether an external timing signal is available;
      upon determining that the external timing signal is available, synchronizing the master clock with the external timing signal;
      based on a clock cycle of the master clock, propagating a plurality of pulse timestamp messages from the master processing node to a plurality of sensors of the sensor apparatus;
      receiving sensor data from the plurality of sensors; and generating, based at least in part on the sensor data and at least in part on the plurality of pulse timestamp messages, output data to enable processing for controlling the autonomous vehicle.

12. The sensor synchronization system of claim 11, further comprising:
upon determining that the external timing signal is available, determining that the master clock remains synchronized, within a predetermined threshold, with the external timing signal.

13. The sensor synchronization system of claim 12, wherein determining that the master clock remains synchronized with the external timing signal includes determining that a master clock time skew remains beneath the predetermined threshold even after the external timing signal is lost.

14. The sensor synchronization system of claim 11, further comprising:
dividing the clock cycle of the master clock into a plurality of timing intervals; and
generating a plurality of sensor pulses, in relation to the plurality of pulse timestamp messages, based at least in part on one or more framerates or resolutions of each of the plurality of sensors of the sensor apparatus, wherein each of the plurality of sensor pulses are aligned with a respective one of the plurality of timing intervals.

15. The sensor synchronization system of claim 14, wherein the number of the plurality of timing intervals into which the clock cycle of the master clock is divided is based at least in part on a framerate or resolution of a second sensor apparatus.

16. The sensor synchronization system of claim 14, wherein the sensor data is captured by the plurality of sensors in accordance with a sensor activation schedule based on the plurality of sensor pulses.

17. The sensor synchronization system of claim 11, further comprising:
continuously updating a skew and offset on the low-power clock based on the clock cycle of the master clock.

18. The sensor synchronization system of claim 17, wherein the master clock and the low-power clock are located on the microcontroller for the master processing node.

19. The sensor synchronization system of claim 11, further comprising:
generating a three-dimensional sensor image for autonomous vehicle navigation based at least in part on the sensor data.

20. A non-transitory computer-readable storage medium containing instructions that, when executed by a processor of a sensor synchronization system for an autonomous vehicle, causes the sensor synchronization system to:
upon initializing a master clock on a master processing node for a sensor apparatus of the autonomous vehicle, determine whether an external timing signal is available;
upon determining that the external timing signal is available, synchronize the master clock with the external timing signal;
based on a clock cycle of the master clock, propagate a plurality of pulse timestamp messages from the master processing node to a plurality of sensors of the sensor apparatus;
receive sensor data from the plurality of sensors; and
generate, based at least in part on the sensor data and at least in part on the plurality of pulse timestamp messages, output data to enable processing for controlling the autonomous vehicle.

\* \* \* \* \*